United States Patent
Mikami et al.

(10) Patent No.: US 9,604,872 B2
(45) Date of Patent: Mar. 28, 2017

(54) GLASS AND OPTICAL ELEMENT PRODUCTION METHOD

(71) Applicants: Shuhei Mikami, Tokyo (JP); Yasuhiro Fujiwara, Tokyo (JP)

(72) Inventors: Shuhei Mikami, Tokyo (JP); Yasuhiro Fujiwara, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/410,519

(22) PCT Filed: Jun. 21, 2013

(86) PCT No.: PCT/JP2013/067050
§ 371 (c)(1),
(2) Date: Dec. 22, 2014

(87) PCT Pub. No.: WO2013/191270
PCT Pub. Date: Dec. 27, 2013

(65) Prior Publication Data
US 2015/0218041 A1    Aug. 6, 2015

(30) Foreign Application Priority Data

Jun. 22, 2012  (JP) .................................. 2012-141452
Jun. 22, 2012  (JP) .................................. 2012-141453
(Continued)

(51) Int. Cl.
C03C 3/21       (2006.01)
C03C 3/064      (2006.01)
(Continued)

(52) U.S. Cl.
CPC .................. *C03C 3/21* (2013.01); *C03B 5/16* (2013.01); *C03B 5/193* (2013.01); *C03B 5/43* (2013.01);
(Continued)

(58) Field of Classification Search
CPC .. C03B 5/16; C03B 5/43; C03B 5/193; C03B 11/005; C03C 3/21; C03C 3/064
See application file for complete search history.

(56) References Cited

U.S. PATENT DOCUMENTS 3,871,853 A * 3/1975 Dietz .................... C03C 4/0071
                                                 65/134.2
5,246,892 A    9/1993 Yanagita et al.
(Continued)

FOREIGN PATENT DOCUMENTS

JP   H05-178638 A    7/1993
JP   2005-132713 A   5/2005
(Continued)

OTHER PUBLICATIONS

Sep. 10, 2013 International search report issued in Application No. PCT/JP2013/067050.
(Continued)

*Primary Examiner* — Queenie Dehghan
(74) *Attorney, Agent, or Firm* — Oliff PLC

(57) ABSTRACT

[Problem] The transmittance of glass can be dramatically improved as a result of this glass production method. In addition, the amount of rare metal, such as platinum, that melts into glass can be greatly reduced. [Solution] A glass production method whereby the water content in molten glass is increased, in a melting step (i) in which a glass raw material including at least one type of component among $TiO_2$, $Nb_2O_5$, $WO_3$, and $Bi_2O_3$ is heated inside a melting container and melted, and a molten glass is obtained.

23 Claims, 3 Drawing Sheets

(30) Foreign Application Priority Data

| Jun. 22, 2012 | (JP) | 2012-141454 |
|---|---|---|
| Oct. 31, 2012 | (JP) | 2012-240953 |
| Oct. 31, 2012 | (JP) | 2012-240954 |
| Oct. 31, 2012 | (JP) | 2012-240955 |
| Apr. 26, 2013 | (JP) | 2013-094498 |
| Apr. 26, 2013 | (JP) | 2013-094501 |

(51) Int. Cl.
  *C03B 11/00* (2006.01)
  *C03B 5/16* (2006.01)
  *C03B 5/193* (2006.01)
  *C03B 5/43* (2006.01)
  *C03C 3/068* (2006.01)

(52) U.S. Cl.
  CPC ............ *C03B 11/005* (2013.01); *C03C 3/064* (2013.01); *C03C 3/068* (2013.01); *Y02P 40/57* (2015.11)

(56) References Cited

U.S. PATENT DOCUMENTS

| 5,922,097 | A * | 7/1999 | Kobayashi | C03B 5/2356 65/134.1 |
|---|---|---|---|---|
| 7,358,205 | B2 * | 4/2008 | Narita | C03B 5/193 501/66 |
| 7,930,901 | B2 * | 4/2011 | Fujiwara | C03C 3/066 501/45 |
| 2005/0011228 | A1 * | 1/2005 | Hayashi | C03B 11/005 65/32.1 |
| 2011/0126976 | A1 | 6/2011 | Kikutani et al. | |
| 2013/0135714 | A1 * | 5/2013 | Kondo | C03C 3/247 359/359 |
| 2014/0228197 | A1 * | 8/2014 | Oogaki | C03C 3/16 501/46 |
| 2015/0218041 | A1 | 8/2015 | Mikami et al. | |

FOREIGN PATENT DOCUMENTS

| JP | 2007-197258 A | 8/2007 |
|---|---|---|
| JP | 2010-057893 A | 3/2010 |
| JP | 2011-042556 A | 3/2011 |
| JP | 2011-046550 A | 3/2011 |
| JP | 2011-246344 A | 12/2011 |
| TW | I490180 B | 7/2015 |

OTHER PUBLICATIONS

Dec. 23, 2015 Office Action issued in Taiwanese Patent Application No. 104117379.

* cited by examiner

GLASS AND OPTICAL ELEMENT PRODUCTION METHOD

TECHNICAL FIELD

The present invention relates to a production method of glass and optical element having excellent transmittance.

DESCRIPTION OF THE RELATED ART

Recently, as devices of photographic optical system and projection optical system or so has become more functional and more compact, there are increasing needs of an optical glass having high refractive index as the material of effective optical element.

The optical glass having high refractive index comprises large amount of high refractive index component such as Ti, Nb, W, Bi or so as the glass component. These components are easily reduced during the melting process of the glass, and these components being reduced absorbs the light of the short wavelength side at the visible range; thus the coloring of the glass increased (hereinafter, it may be referred as "reduced color").

Also, the high refractive index components which are easily reduced reacts (oxidizes) with noble metal material such as platinum or so which are widely used as the material of the crucible; and the noble metal ion produced by the oxidation of the noble metal causes to dissolve in the molten glass. The noble metal ion dissolved in the molten glass absorbs the visible light; hence the coloring of the glass increases.

The optical glass having high refractive index comprising a lot of high refractive index component had problems such as the coloring of the glass, and particularly the transmittance of the short wavelength side at the visible range was easily decreased. As the means to solve such problem, the patent article 1 proposes the technical arts to bubble the non-oxidizing gas in the molten glass, or the technical art of heat treating the obtained glass by re-heating it.

However, when melting the glass comprising large amount of high refractive index component such as Ti, Nb, W, Bi or so, when bubbling the reducing gas such as carbon monoxide, hydrogen or so which are recited in the patent article 1, the high refractive index component added as the oxidized product is reduced and becomes metal, forms alloy with the metal material such as platinum or so constituting the melting container; thus the strength and the durability of the melting container declined significantly. Also, as the inactive gas such as helium or argon or so are expensive, these are not suitable for the bubbling taking long time as the production cost will increase.

Also, since the melting of the glass is generally carried out in the air atmosphere, the oxygen in the air may react with the noble metal material such as platinum or so which is the material of the melting container. Particularly, in case the melting container is platinum based material, platinum dioxide ($PtO_2$) is generated and dissolves into the molten material; or it may dissolve into the molten material as platinum ion ($Pt^{4+}$) from the boundary between the molten material and the platinum based material. As a result, coloring of the glass may occur.

Therefore, the technical art to bubble the non-oxidized gas as in the patent article 1 cannot sufficiently suppress the noble metal such as platinum or so from dissolving into the glass, thus it was still difficult to significantly reduce the coloring of the optical glass having the high refractive index.

PRIOR ART

Patent Article

[Patent Article 1] Japanese Patent Application Laid Open. No. 2011-246344

DISCLOSURE OF INVENTION

Problem to be Solved by the Invention

The present invention was achieved in view of such circumstances, and its object is to provide the production method of the glass and the optical element having excellent transmittance.

Means for Solving the Problems

The gist of the present invention wherein the object is to solve such problem is as described in below.

[1] A glass production method comprising carrying out a procedure to increase a water content in a molten glass during a melting step (i) of a heating and melting a glass raw material including at least one of $TiO_2$, $Nb_2O_5$, $WO_3$ and $Bi_2O_3$ in a melting container to thereby obtaining the molten glass.

[2] The glass production method as set forth in [1], wherein said glass raw material includes 20 mol % or more in total of $TiO_2$, $Nb_2O_5$, $WO_3$, and $Bi_2O_3$.

[3] The glass production method as set forth in [1] or [2], wherein said procedure to increase the water content in said molten glass is carried out by at least one of a treatment of adding water vapor in a melting atmosphere and a treatment of bubbling a gas including water vapor in a molten material.

[4] The glass production method as set forth in any one of [1] to [3], wherein said melting container is made of a metal material.

[5] The glass production method as set forth in any one of [1] to [4], wherein oxygen partial pressure in the melting container during said melting step (i) is lower than the oxygen partial pressure in an air.

[6] The glass production method as set forth in any one of [1] to [5] further comprising
step (ii) of draining out said molten glass from said melting container,
step (iii) of molding said molten glass; and at least one of said step (ii) and said step (iii) are carried out under oxidizing atmosphere.

[7] The glass production method as set forth in any one of [1] to [6] further comprising step (iv) of heat treating said glass; and said step (iv) is carried out under oxidizing atmosphere.

[8] The glass production method as set forth in [6] or [7], wherein said oxidizing atmosphere is an air atmosphere or atmosphere having higher oxygen partial pressure than air.

[9] The glass production method as set forth in any one of [1] to [8], wherein said glass is phosphate glass.

[10] A production method of an optical element comprising,
step of producing a glass by the production method as set forth in any one of [1] to [9], and
step of further molding or processing said glass.

The Effect of the Invention

According to the glass production method of the present invention, the transmittance of the glass can be improved drastically. Also, the amount of the noble metals such as platinum or so dissolved into the glass can be reduced significantly.

THE EMBODIMENTS FOR CARRYING OUT THE INVENTION

Figure 1:
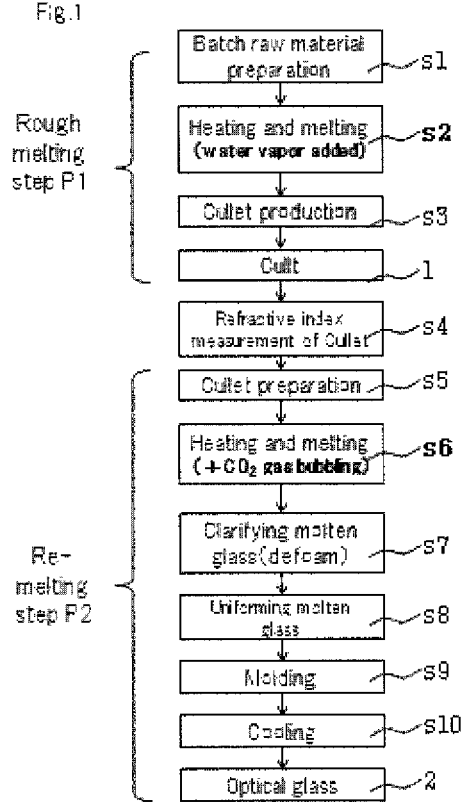
FIG. 1 shows the flow chart of steps of from the preparation of the batch raw material to the production of the glass.

The glass production method of the present embodiment is characterized by the carrying out the procedure to increase the water content in the molten glass in the melting step (i) of heating and melting the glass raw material including component of at least one of $TiO_2$, $Nb_2O_5$, $WO_3$, and $Bi_2O_3$ to obtain the molten glass.

In the glass production method of the present embodiment, the procedure to increase the water in the molten glass is preferably carried out by supplying the water in the melting container (hereinafter, it will be referred as the first embodiment), or by including the water in the glass raw material and also roughly sealing the melting container being roughly sealed during the heating-melting step (hereinafter, it will be referred as the second embodiment).

Note that, the procedure to increase the water content in the molten glass means that the water content in the molten glass is higher than when such procedure is not carried out. In case the procedure to increase the water content is not carried out, the water content in the molten glass declines over the time. The procedure to increase the water content in the molten glass also includes the procedure to reduce or suppress such decline of the water content in the molten glass.

The glass produced by the production method of the present embodiment as such includes high refractive index component (the content of at least one or more of $TiO_2$, $Nb_2O_5$ $WO_3$, and $Bi_2O_3$), and even when the glass is colored dark, the coloring of the glass can be significantly reduced by heat treating this glass in the oxidizing atmosphere during the subsequent steps. That is, the glass obtained by the production method of the present embodiment after the heat treatment has little coloring and has excellent transmittance. The present inventors speculate the reason how such effect can be obtained as described in below.

First, when melting the glass having high refractive index including the high refractive component such as $TiO_2$, $Nb_2O_5$, $WO_3$ and $Bi_2O_3$ using the melting container of the noble metal such as platinum, the metal ion (the ion of metal constituting the melting container) is suppressed from dis-solving into the molten glass by placing the molten glass to the reduced side when carrying out the melting. However, if the molten glass is reduced too much, as previously mentioned, the melting container turns into alloy. Also, even if the molten glass is not reduced too much, but if the coloring of the glass increases by the high refractive index component being reduced, the degree of the reduction of the coloring will be only small even after the heat treatment to this glass in the subsequent step is carried out.

In order to overcome such problem, the glass may be made by forming a condition wherein the metal material constituting the melting container does not dissolve into the molten glass, and by carrying out the treatment to the obtained glass, the coloring can be reduced significantly.

The present inventors speculate regarding the phenomena of coloring reduction of the glass due to the heat treatment as follows. First, the coloring of the optical glass can be reduced by carrying out the heat treatment of the glass under the oxidizing atmosphere, however each ion of Ti, Nb, W, Bi or so which are in the reduced state are oxidized, and the visible light absorbance of each ion becomes weaker. If the speed of oxidizing Ti, Nb, W and Bi are slow, the improvement of the coloring will be small even if the glass is heat treated. In order to significantly reduce the coloring of the glass, the oxidizing speed of Ti, Nb, W and Bi during the heat treatment can be made larger.

If there is an ion which easily moves in the glass, and as long as this ion does not directly influence the coloring, such ion may make speedy movement in the glass and may give and take the electric charge, thereby it would be possible to reduce the coloring in short period of time by promptly oxidizing Ti, Nb, W, Bi which has been reduced. As for such ion, $H^+$ is thought to be suitable; however, in order to make $H^+$ further easier to move, $OH^-$ is introduced in the glass structure to allow the hopping of $H^+$ from $OH^-$, thereby it is thought that the oxidation speed during the heat treatment can be increased.

Therefore, when the glass is heat treated, in order to significantly reduce the coloring thereof, $H^+$ and $OH^-$ are introduced as much as possible in the glass. That is the water content of the glass may be made large as much as possible.

Here, in case of producing the glass from the glass raw material, the raw material having large amount of water content as orthophosphoric acid and hydroxides such as aluminum hydroxide, calcium hydroxide or so may be used; however the water evaporates during the step of melting the glass raw material to form a molten glass, or during the state in which the molten glass has high temperature. Also, even in case the batch raw material is prepared from the compounds, and this batch raw material is carried out with rough melting to form the cullet, and this cullet is re-mixed by re-melting in the melting container to obtained the cullet; the water originally comprised in the batch raw material is lost when forming the cullet, and the water is also lost during the re-melting in the melting container. Therefore, even if the glass is produced by using either method, usually, the water content of the glass will become extremely little. As a result, the coloring cannot be reduced significantly by heat treating this glass.

However, if the water can be supplied from the outside to the molten glass, the water which was lost by evaporating from the high temperature molten glass can be supplemented, thus the water content of the glass can be easily made larger.

Alternatively, it may be possible by using the glass raw material comprising the water, and also by roughly sealing the melting container during the heating-melting step. In this case, as the as the airtightness of the melting container will be enhanced, the water comprised in the glass raw material is suppressed from evaporating out of the melting container during the heating and melting of the glass raw material in the melting container. Therefore, as a result, the water content of the glass can be made larger easily.

Note that, the raw glass material comprising the water can be obtained by using the orthophosphoric acid or hydroxides as mentioned in above. Also, other than this, the glass raw material comprising the water can be obtained by forming cullet by introducing the water to the molten product obtained by the rough-melting. For the cullet raw material (the glass raw material including the water) produced as such, the water adhered to the surface thereof can be removed during the drying of the cullet. However, the water taken to the inside of the cullet will contribute to the increase of the water content in the molten glass obtained by the re-melting (the heating and the melting step).

Also, in order to increase the water content of the glass as much as possible, it is also effective to use the glass component having strong effect of taking in or maintaining the water in the glass, that is to use phosphoric acid component (for example, orthophosphoric acid, metaphosphate, pyrophosphoric acid or so) as the glass raw material. Therefore, for the glass production method of the present embodiment, it is preferable to use the glass raw material comprising the phosphoric acid component. Here, as phosphoric acid component, typically, orthophosphoric acid ($H_3PO_4$) may be mentioned, however other than this, variously known phosphoric acid compounds such as pyrophosphoric acid ($H_4P_2O_7$) or various phosphates (particularly the hydrates) or so can be used, and two or more thereof may be combined for use.

Also, for the glass production method of the present embodiment, the water content of the glass obtained is high, and as a result, when the glass is heat treated, the coloring can be reduced significantly. Particularly, for the glass production method of the present embodiment, if the procedure to increase the water in the molten glass is carried out by the first embodiment, the water content in the glass can be made even higher than the case of only carrying out the second embodiment, and the effect of reducing the coloring can be even better.

Note that, in the first embodiment mentioned in the above, the procedure to increase the water in the molten glass is carried out during the heating-melting step by supplying the water in the melting container. Thereby, the water can be supplied to the molten glass from the outside, and as a result, the water content of the glass can be made larger. As for the embodiment of supplying the water into the melting container, it is not particularly limited, however preferably it is selected from any one of, the first supplying embodiment wherein the water vapor is supplied into the atmosphere nearby the liquid surface of the molten glass; the second supplying embodiment wherein the water vapor is supplied in the molten glass by bubbling; and the third supplying embodiment of combining the first supplying embodiment and the second supplying embodiment. Note that, usually the water is preferably supplied in the form of the water vapor (gaseous); however it may be also supplied in the form of the glass raw material powder (solid) of which has high water content and that the component after the removal of the water is roughly the same as the glass.

On the other hand, in case the partial pressure of the water vapor of the atmosphere nearby the liquid surface of the molten glass is low, the water in the molten glass becomes easy to transpire to the outside. However, in the second embodiment mentioned in the above, the procedure to increase the water in the molten glass uses the glass raw material comprising the water, and carries out the heating-melting step by roughly sealing the melting container. That is, the molten glass comprising the water will be sealed in a small space of the melting container. Therefore, the partial pressure of the water vapor of the atmosphere nearby the liquid surface of the molten glass becomes high and enables to suppress the evaporation of the water. As a result, the water content of the glass can be made high.

Note that, as the method to roughly seal the melting container, it is not particularly limited; however if the melting container comprises the opening part, the opening part of the melting container may be covered by lid. In this case, the heating-melting step is carried out while placing the molten glass in the sealed space formed by the melting container and the lid. Note that, the lid may be simply placed on the melting container in order to close the opening part of the melting container. In this case, as the pressure inside the sealed melting container increases, the roughly sealed state can be secured, although small amount of gas will leak out of the melting container to the outside. However, after the opening part of the melting container being covered by the lid, the air tightness may be further increased by firmly fixing the lid against the melting container by applying a pressing force so that the lid is pressed against the opening part, or by carrying out the sealing treatment to the opening part.

Also, for "roughly sealing the melting container", other than the embodiment (1) wherein directly covering the lid to the opening part of the melting container or directly sealing the opening part; the embodiment (2) wherein the melting container while the opening part is opened may be placed in the housing container to house this melting container, then directly covering the opening part of this housing container or directly sealing this opening part; and the embodiment (3) wherein the melting container having the opening part being opened is placed in the melting container housing chamber of sealable type in the melting furnace or so, are included. Also, it may be carried out by combining the above mentioned embodiments (1) to (3) accordingly.

Note that, from the point of efficiently increasing the water content in the molten glass, during the glass production of the present embodiment, the above mentioned first embodiment is preferably carried out as the procedure to increase the water content of the molten glass. That is, as the procedure to increase the water content in the molten glass, it is preferable to at least carry out the treatment to add the water vapor in the melting atmosphere and the treatment of carrying out the bubbling of the gas comprising the water vapor in the molten material.

The method of adding the water vapor in melting atmosphere is not particularly limited, but for example the method of introducing the connecting pipe to the crucible from the opening part provided at the melting device, and depending on the needs, supplying the gas comprising the water vapor through this pipe to the space in the crucible may be mentioned.

The flow amount of the gas comprising the water vapor to be supplied into the space of the crucible is not particularly limited, and it can be controlled based on the measured result of βOH of the glass which is produced experimentally. For example, in case of supplying the water vapor in the melting container roughly sealed, the glass having the desired βOH can be obtained by just supplying relatively small amount of water vapor. On the other hand, in case of melting the glass by placing the crucible without the lid in the glass melting furnace, the volume inside the glass melting furnace becomes larger compared to the volume inside the crucible, thus in order to have desired βOH value, relatively large amount of the water vapor will be supplied into the glass melting furnace. Based on such experiment result, the supplying amount of the water vapor; that is by feeding back the flow amount of the gas to the next production, the glass having desired βOH value can be produced. Note that, hereinafter, the flow amount of the gas, the flow amount of the water vapor, the atmospheric adding flow amount, the supplying amount of the water vapor are the value converted in 25° C. and 1 atmospheric pressure.

Also, as the bubbling method, it is not particularly limited, and known methods can be used. For example, the method of introducing the gas comprising the water vapor to the molten material by placing the pipe made of platinum or platinum alloy into the molten material in the melting container; and the method of introducing the gas comprising the water vapor into the molten material from the pipe which is installed near the bottom part of the melting container and the pipe is made of the same material as the material of the melting container or so may be mentioned.

The bubble diameter of the gas comprising the water vapor which is introduced in the molten material is preferably a diameter of 0.01 to 100 mm, and more preferably 0.1 to 30 mm. By setting within the above mentioned range, the water content in the molten glass is thought to be increased effectively. Note that, in case the bubble diameter is too small, there is trouble such that the tube for bubbling which is introduced in to the molten material may become easily clogged.

The flow amount of the gas comprising the water vapor which is introduced into the molten material is not particularly limited, and it may be regulated based on the measured result of βOH of the glass which is produced experimentally. For example, when βOH of the glass produced experimentally is measured and if the measured result is smaller than the desired value, the flow amount of the gas is increased; on the other hand, if the measured result is larger than the desired βOH value, the flow amount of the gas is regulated to reduce the amount. As such, the flow amount of the gas can be regulated from the measured result obtained by βOH of the glass produced experimentally. As such, based on the measurement result of βOH of the glass produced experimentally, the supplying amount of the water vapor, that is the flow amount of the gas is feed backed to the subsequent production, thereby the glass having the desired βOH can be produced.

The content of the water vapor in the gas comprising the water vapor is preferably 10 vol % or more, more preferably 20 vol % or more, further preferably 30 vol % or more, even more preferably 40 vol % or more, even further preferably 50 vol %, furthermore preferably 60 vol %, even furthermore preferably 70 vol % or more, particularly preferably 80 vol % or more, and further particularly preferably 90 vol % or more. The higher the content of the water vapor is, the more preferable it is; and by setting within the above mentioned range, the reduction effect of the coloring can be enhanced in the glass obtained at the end, further the content of the noble metals can be reduced, and also the transparency can be improved.

Note that, the gas comprising the water vapor may be those prepared, or those which are commercially available ones and it may be a mixed gas with other gas. As other gas, for example, the air or so may be mentioned.

Also, in order to increase the water content in the molten glass, the molten material may be stirred in the melting atmosphere added with water vapor.

Note that, from the point of making the coloring reduction easy by the heat treatment under the oxidizing atmosphere and by increasing the water content in the glass, in the present embodiment, the procedure to increase the water in the molten glass is particularly preferably carried out by combining the first embodiment and the second embodiment.

Also, according to the glass production method of the present embodiment, the noble metal (platinum or so) derived from the melting container or so can be effectively prevented from dissolving into the glass, and the coloring caused by the noble metal ion can be further reduced.

Hereinafter, the example wherein the melting container is platinum (Pt) will be used for explanation, however same applies even when the melting container made of metal material other than noble metal such as platinum.

Usually, the melting of the glass is carried out under the air atmosphere, and in some case the oxygen in the air may react with the noble metal material such as platinum or so which is the material of the melting container. Particularly, if the melting container is the platinum based material, platinum dioxide ($PtO_2$) is produced and dissolves into the molten material, or it may dissolve into the molten material as platinum ion ($Pt^{4+}$) from the boundary between the molten material and the platinum based material. The noble metal ion dissolved into the molten glass absorb the visible light, thus the coloring of the glass tends to increase.

In order to reduce the coloring derived from such platinum ion, the method of suppressing the dissolving of the metal ion to the molten glass by setting the melting atmosphere to reducing atmosphere or so may be mentioned. However, if the molten glass is made to the reduced side too much, the melting container forms an alloy, and the strength and the durability of the melting container is reduced significantly. Also, there is a method to substitute the melting atmosphere with inactive gas; however inactive gas such as Ar or so is expensive and not suitable for the melting over long period of time.

On the contrary to this, the glass production method of the present embodiment can suppress the dissolving of the metal ion into the molten glass by carrying out the procedure to increase the water content in the molten glass.

That is, due to the procedure to increase the water content in the molten glass (for example, by supplying the water in the melting container), the oxygen partial pressure in the melting atmosphere is reduced, and prevents the platinum material or so which is the material of the melting container or so (crucible or so) from being oxidized. As a result, it can effectively prevent platinum dioxide or platinum ion ($Pt^{4+}$), produced due to the reaction between oxygen and the platinum material or so under the melting atmosphere, from dissolving into the molten material (glass); and the dissolved amount of platinum (Pt) in the obtained glass can be reduced even more.

The glass produced by the production method of such embodiment has extremely small content of noble metal such as Pt derived from the production apparatus such as the melting container or so. Therefore, the coloring of the glass due to the ultraviolet ray so called solarization is less. Therefore, in case such glass is used as for example the optical element, the change of the transmittance over the time is little. Also, when fixing the optical element by using an ultraviolet ray curable adhesive agent, it is possible to obtain the effect of which the transmittance does not decline even after the ultraviolet ray is irradiated to the optical element.

From the point of reducing the coloring of the glass caused by the noble metal ion, improving the transmittance, reducing the solarization, and reducing the noble metal contaminant or so, the content of the noble metal in the obtained glass is 4 ppm or less. The lower the upper limit of the content of the noble metal is, the more preferable it is, and it is further preferable to have lower upper limit in the order of 3 ppm, 2.7 ppm, 2.5 ppm, 2.2 ppm, 2.0 ppm, 1.8 ppm, 1.6 ppm, 1.4 ppm, 1.2 ppm, 1.1 ppm, 1.0 ppm, 0.9 ppm. The lower limit of the content of the noble metal is not particularly limited; however 0.001 ppm or so will be included inevitably.

As the noble metal, a metal simple substances such as Pt, Au, Rh, Ir or so, and alloy such as Pt alloy, Au alloy, Rh alloy, Ir alloy or so may be mentioned. As for the melting container material or the melting apparatus material, Pt or Pt alloy is preferable as it has heat resistance and corrosion resistance among the noble metals. Therefore, for the glass produced using the melting container and melting apparatus made of Pt or Pt alloy, the content of Pt comprised in the glass is preferably 4 ppm or less. As for more preferable upper limit of the content of Pt, it is the same as the content of the noble metal included in the glass. Also, the lower limit of the content of Pt is not particularly limited; however 0.001 ppm or so will be included inevitably.

Further, according to the glass production of the present embodiment, the transparency can be improved drastically.

Generally, for the glass production, the glass of uniform and with less bubble is demanded. In order to obtain such glass with less bubble, usually refining step wherein the dissolved gas in the molten glass is released (defoamed) is provided; and the transparency of the glass depends on the amount of the dissolved gas in the molten glass. Such dissolved gas amount is largely influenced by the composition of the glass (particularly of the type of the raw material), and the melting time and the melting number. However, if the dissolved gas can be supplemented during the melting step, the problem of the transparency can be solved.

It is speculated that the glass produced by the production method of the present embodiment is able to increase the dissolved gas in the molten glass by carrying out the procedure to increase the water content in the molten glass (for example, by supplying the water into the melting container or so). That is, the water actively introduced in the molten glass (for example the water vapor) functions as the dissolved gas, and thought to improve the transparency of the glass.

According to the glass production of such present embodiment, the glass has excellent transparency, thus the time required for the refining step can be shortened, and the productivity can be improved.

Note that, the refining tub for the refining step is generally constituted by the metal material of the platinum or platinum alloy. Therefore, the longer the refining step becomes, the more prominent the problem becomes such as transmittance deterioration caused by the dissolving of the platinum ion to the molten material. However, according to the glass production of such present embodiment, the time necessary for the refining step can be shortened, thus the contact time between the molten glass and the melting container or so can be reduced, and it is speculated that the dissolving of the noble metal ion such as platinum or so can be further reduced.

The use of the glass obtained from the production method of the present embodiment is not particularly limited, and for example it may be suitably used as the optical glass.

As mentioned in the above, the optical glass comprising large amount of high refractive index component (Ti, Nb, W, Bi or so) has prominent problem of the coloring of the glass (the reduced color); however according to the production method of the present embodiment, the optical glass comprising excellent transmittance can be easily obtained.

That is, the optical glass obtained by the production method of the present embodiment can decrease the reduced color efficiently by heat treatment even if it comprises large amount of high refractive index component. Further, even in case of using the noble metal material such as platinum or so as the melting container or so, the noble metal material is efficiently suppressed from dissolving into the molten glass, thus the coloring derived from the noble metal ion is extremely little. The optical glass obtained by the production method of the present embodiment has excellent transmittance.

Also, according to the production method of the present embodiment, the dissolved gas in the molten glass can be increased by the procedure of increasing the water content in the molten glass, thus the transparency can be improved significantly. As a result, the optical glass of uniform and with little bubble can be obtained in short period of time.

In the glass production method of the present embodiment, for other matters other than described in the present specification, regarding the preparation method of the glass raw material, the heating method of the glass raw material, the melting method, the molding method of the molten glass, the known method can be employed appropriately. Also, as for the material constituting the glass raw material or the melting container used for the glass production method of the present embodiment, known materials can be used appropriately.

Here, as the material constituting the melting container used for the production of the glass, usually the material (for example, metal material or quartz material or so) having the heat resistance and the corrosion resistance under the temperature-atmosphere which the molten glass is melted can be used appropriately.

Note that, depending on the glass composition being produced, the melting product material which shows significant erosiveness may be produced, and the molten glass may react with the material constituting the melting container and the melting container may melt. Therefore, when selecting the material constituting the melting container, it is preferable to select the appropriate material in accordance with the glass composition.

For example, in case of phosphate glass (glass comprising $P_2O_5$, and at least one oxide selected from the group consisting of $TiO_2$, $Nb_2O_5$, $WO_3$ and $Bi_2O_3$) comprising the high refractive index, in particular when the batch raw material is heated-melted, the melting product material showing significant erosion is produced. Such melting product material tends to erode the material having excellent corrosion resistance such as platinum or so, hence the noble metal materials such as platinum or so is eroded by the above mentioned melting product material, and dissolve into the molten material and generate contaminant or increase the coloring of the glass.

Therefore, in case of phosphate glass comprising the high refractive index component, as the melting container for heating-melting the batch raw material, the material of the melting container or so is preferably selected separately from the latter half of the melting step or the refining step.

As the melting container or so used for the heating-melting the batch raw material, the container and the apparatus having the fire resistance such as made of quartz or so is suitable. The flame resistant product such as quartz or so is eroded by the above mentioned melting product material, however even if it gets into the molten material by being eroded, it becomes part of the glass composition; hence it has lesser problem that in case of noble metal material. At the latter half of the melting step or the refining step, there is only little problem of the melting product material erodes the noble metal material, hence it is preferable to use the container or the apparatus made of platinum or platinum alloy.

On the other hand, in case borate glass (the glass including comprising B2O3 and the high refractive index component at least one oxide selected from the group consisting of $TiO_2$, $Nb_2O_5$, $WO_3$ and $Bi_2O_3$), the problem such as the erosion of the noble metal by the molten product material such as in the above mentioned phosphate glass. Rather, in case of borate glass, the flame resistance container such as quartz or so tends to be eroded significantly. Therefore, as for the melting container or so, it is preferable to use the container or the apparatus made of noble metal such as platinum or platinum alloy which are hardly eroded during the production process of the glass.

In the glass production method of the present embodiment, as the material constituting the melting container used for the production of the glass, the metal material is preferably used. Here, as the metal material, it is preferable to use at least one selected from noble metal and noble metal alloy. As the glass production of the present embodiment, the water content in the molten glass is maintained high compared to the general glass production method. Thereby, the above mentioned noble metal or the noble metal alloy is not eroded by the molten glass, and will be able to maintain the molten glass under the redox state wherein the reduced high refractive index component does not form alloy with the material constituting the melting container. Note that, from the point of excellent corrosion resistance and heat resistance, it is preferable to use platinum and gold or so as the noble metal, and platinum alloy and gold alloy or so as the noble metal alloy.

In the glass production method of the present embodiment, the heating-melting step preferably comprises, usually in addition to the melting step of heating the glass raw material to melt it and form molten glass, the refining step of facilitating the defoaming of the molten glass, and the uniforming step of decreasing the temperature of the refined molten glass to have a suitable viscosity for molding and stirring to make it uniform.

For the glass raw material, the mixed raw material (the batch raw material) obtained by scaling and thoroughly mixing the raw material corresponding to the glass component, and the mixed cullet can be used so that the optical glass with desired characteristic can be obtained.

In case the cullet is used as the glass raw material, the cullet forming step (rough melting step) by carrying out the rough melt of the batch raw material is performed before the re-melting step. Also, the cullet preferably is carried out with the measurement of the refractive index in advance. In case the measured value of the refractive index is equal to the desired value, the cullet is used as the mixed cullet, and if the measured value of the refractive index does not match the desired value, the mixed cullet is formed by mixing the cullet having the higher refractive index than the desired value and the cullet having the lower value than the desired value.

Note that, the cullet is made of glass; however it does not have to be a uniform glass. Also, the cullet may comprise bubble. Further, the non-melting material of the batch raw material may be included as well. For the composition and the optical characteristic (for example, the refractive index and Abbe number or so) of the cullet, the glass of uniform and without bubble is formed by re-melting the cullet, and the composition and the optical characteristic of this glass are defined as the composition and the optical characteristic of cullet respectively.

For the method of producing the cullet (rough melting-re-melting method), or for the method of melting the batch raw material during the direct melting step (batch direct method), the heating temperature of the glass during the heating-melting step is preferably maintained to 800 to 1500° C., more preferably 1400° C. or less, and further preferably 1300° C. or less, from the point of suppressing the excessive reduction of Ti, Nb, W and Bi, and suppressing the melting material thereof from forming ions in case the melting glass is constituted by the metal material, and securing the water content in the glass. Further, from the point of improving the transparency, and making it easy to significantly reduce the coloring during the heat treatment of the glass in the oxidizing atmosphere, the heating temperature of the glass during the heating-melting step is set to have the highest temperature at the refining step; that is the glass is preferably melted below the refining temperature.

Also, if the time from the start to the end of the heating-melting step is too long, it promotes the reduction of the high refractive index component, and in case the melting container is made of metal material, the ionization of the metal material thereof is facilitated, thus the water content in the glass tends to decline. Therefore, it is preferable that the time from the start to the end of the heating-melting step is within 100 hours. Note that, the time from the start to the end of the heating-melting step may be adjusted appropriately depending on the size of the capacity of the melting container.

The glass production of the present embodiment is more preferably carried out by rough melting-re-melting method.

That is, the glass production method of the present embodiment preferably comprises, a rough melting step to obtain the cullet by melting the mixed material, and a re-melting step to obtain the glass by re-melting said cullet; and during at least one of said rough melting step and re-melting step, the procedure to increase the water content in the molten glass is carried out.

Particularly, in case the glass is produced by rough melting-re-melting method, the melting temperature (rough melting temperature) of the batch raw material during the rough melting is preferably within the range of 800 to 1400° C. Note that the solubility of the dissolved gas declines as the temperature of the molten material increases, hence for increasing the refining effect, the temperature of the molten material during the rough melting step is preferably the same as the melting temperature (the re-melting temperature) of the cullet during the re-melting step, or it is preferably less than the melting temperature of the cullet; and particularly it is preferably lower than the refining temperature during the re-melting step.

Also, the melting time during the rough melting step can be adjusted appropriately by considering the amount introduced into the crucible of the batch raw material and capacity of the crucible, and for example the melting time may be within the range of 1 to 100 hours, and more preferably 0.1 to 20 hours.

Also, the melting temperature (the re-melting step) of the mixed cullet during the re-melting step is preferably within the range of 800 to 1500° C. Note that, in order to increase the refining effect, it is preferable to make this re-melting temperature lower than the refining temperature. The melting time during the re-melting step can be adjusted appropriately considering the capacity of the crucible, and the amount introduced of the mixed cullet into the crucible. For example, the melting time during re-melting may be within the range of 1 to 100 hours, and more preferably 2 to 20 hours.

Note that, in the glass production method of the present embodiment, the atmosphere during the melting is not particularly limited, however from the point of effectively increasing the water content in the molten glass, the water vapor is preferably added to the melting atmosphere.

The melting atmosphere begins the melting under the melting atmosphere other than the water vapor such as air atmosphere or nitrogen atmosphere or so, then by the procedure to increase the water content in the molten glass, the water vapor may be added to the melting atmosphere from the middle; alternatively the melting atmosphere may be adjusted to water vapor atmosphere in advance.

The partial pressure of the water vapor of the melting atmosphere when carrying out the procedure to increase the water content in the molten glass is higher than the partial pressure of the water vapor in the air, and more preferably it is higher than the oxygen partial pressure. Further, the upper limit of the water vapor partial pressure is not particularly limited, and for example the melting atmosphere can be substituted entirely by the water vapor.

Also, by having high water vapor partial pressure in the melting atmosphere throughout the entire melting step, oxygen is effectively prevented from reacting with the melting container made of noble metal such as platinum or so, and the dissolving amount of Pt or so into the glass can be reduced, and allows to effectively prevent the deterioration (decline) of the transmittance. Further, by maintaining the dissolved gas amount until right before the refining step, the improvement effect of the transparency can be enhanced.

Also, the melting step can carry out by the stirring of the molten material in order to make the molten material uniform. As for the stirring method, the known methods can be used, and for example the method of bubbling the air to the molten material or the method of stirring by the stirring rod or so may be mentioned.

Particularly, the bubbling using the gas including the water vapor, or the stirring of the molten material in the melting atmosphere added with the water vapor is suitable from the point of informing the molten material, and also of increasing the water content in the molten glass.

Also, the glass production method of the present embodiment comprises a melting step (i) of obtaining the molten glass by heating and melting the glass raw material comprising at least one of $TiO_2$, $Nb_2O_5$, $WO_3$ and $Bi_2O_3$, then a draining step (ii) of draining said molten glass out of said melting container, and a molding step (iii) of molding said molten glass.

During the draining step (ii), the molten glass refined and uniformed is drained out from the glass draining pipe installed to the melting container bottom part. The temperature of the glass draining pipe is within the range wherein the draining molten glass does not devitrify, and it is adjusted and maintained so that the molten glass has suitable viscosity for molding.

During the molding step (iii), as long as the molten glass in the melting container can be mold to a predetermined shape, any known method can be used. For example, the molten glass may be drained into the mold to form a block shape, or the molten glass flow having the line shape by flowing down from the pipe and cut at each predetermined length (predetermine amount) and to form glass bulk. Also, in case a shape forming process with high accuracy is carried out during the subsequent steps, the shape of each glass obtained via the molding step may be varied largely. Also, the obtained glass may be colored dark, and the coloring can be reduced by carrying out the heat treatment in the subsequent steps.

In the glass production method of the present embodiment, it is preferable to carry out at least one of the draining step (ii) and the molding step (iii) under the oxidizing atmosphere. Thereby, the reduced color of the glass can be reduced efficiently.

Usually, the reduced color derived from the high refractive index component can be reduced by carrying out the heat treatment to the glass under the oxidizing atmosphere. Particularly, the oxidation of Ti, Nb, W and Bi or so tends to proceed faster as the temperature of the glass is high.

Therefore, it can be thought that the glass with higher temperature; that is the glass of the melting step (i) is better to be exposed under the oxidizing atmosphere. However, in case the melting container of the refining tub is constituted by the noble metal materials or so, the glass of the melting step (i) contacts with the noble metal, hence if the melting atmosphere is oxidizing atmosphere, the noble metal reacts with oxygen in the atmosphere, and causes the ion of the noble metal to dissolve into the glass.

On the other hand, the glass of the draining step (ii) and the molding step (iii) has lower temperature compared to the glass of melting step (i), however it is still maintained high enough compared to the glass which the temperature is decreased after the molding. Therefore, among these steps, the effect of reducing the coloring of the glass by exposing the glass under the oxidizing atmosphere can be expected to exhibit sufficiently. Further, during the draining step (ii) and the molding step (iii), the glass does not contact with the noble metal material constituting the melting container or so, hence the above mentioned problem is less likely to happen.

Therefore, by setting at least one of the draining step (ii) and the molding step (iii) to an oxidizing atmosphere, the reduced color can be efficiently reduced without the risk of the noble metal material or so dissolving into the molten glass.

Also, the surface area of the glass exposed to the oxidizing atmosphere is larger per unit volume for the molten glass flow than the glass block in the mold; hence the reduced color can be reduced further efficiently.

Also, since the reduced color of the glass is reduced during at least one of the draining step (ii) and the molding step (iii), the examination of the glass interior such as verifying of the bubble or the precipitate or so can be done easily for the glass after the molding step (iii). As a result, it is possible to inspect good glass in early stage thus the yield rate is improved.

Also, the glass production method of the present embodiment preferably comprises the heat treating step (iv) of heat treating the produced glass. The heat treatment is preferably carried out in the oxidizing atmosphere. Thereby, the coloring of the obtained glass can be reduced significantly. The glass obtained through the heat treating step has high transparency with little coloring, that is the transmittance in the visible range is high.

The heat treating temperature and the heat treating time during the heat treating step (iv) may be set appropriately so that a desired optical characteristic can be obtained. For example, the heat treating temperature is preferably lower than the softening point of the glass, and higher than the temperature lower by 100° C. from the glass transition temperature (Tg−100° C.).

Note that, when the coloring of the glass is reduced to a predetermined level, the heat treating time can be shortened if the heat treating temperature is high. Also, the heat treating time can be shortened by increasing the oxygen partial pressure in the oxidizing atmosphere. The heat treating time as such changes depending on the heat treating temperature and the oxygen partial pressure in the oxidizing atmosphere; however it can be set so that the coloring of the glass is at the desired level. The heat treating time is typically 0.1 hour to 100 hours preferably.

Note that, the oxidizing atmosphere in the above mentioned draining step (ii), molding step (iii) and heat treating step (iv) is an air atmosphere or the atmosphere having higher oxygen partial pressure than the air.

The method of forming the oxidizing atmosphere is not particularly limited, and for example the method of supplying the oxidizing atmosphere gas or so may be mentioned. As for the oxidizing atmosphere gas, it only needs to be a gas with oxygen, and the oxygen concentration is for example about the same of air or may be higher. As for such oxidizing atmosphere gas, for example the air, gas added with oxygen in the air, or the gas substantially only comprising oxygen or so may be mentioned.

The glass obtained by the production method of the above mentioned embodiment comprises a lot of water due to the procedure to increase the water content in the molten glass, and as mentioned in above, after going through the heat treating step (iv), the coloring is reduced, and has excellent transmittance. The water comprised in such glass (the water content in the glass) can be determined quantitatively by a spectrophotometer as the infrared ray absorbing amount caused by $OH^-$.

The water content in the glass is for example it can be determined by $\beta OH$ value shown by the below equation (1).

$$\beta OH = -[\ln(B/A)]/t \quad (1)$$

Here, in the above equation (1), "t" is the thickness (mm) of said glass used for the measurement of the external transmittance, "A" is the external transmittance (%) at the wavelength of 2500 nm when the light enter into said glass in parallel to the thickness direction thereof, and "B" is the external transmittance (%) at the wavelength of 2900 nm when the light enter into said glass in parallel to the thickness direction thereof. Also, in the above equation (1), "ln" is a natural logarithm. The unit of $\beta OH$ is $mm^{-1}$.

Note that, "external transmittance" is the ratio (Iout/Iin) of the intensity "Iout" of the transmitted light which transmitting out the glass with respect the intensity "Iin" of incident light which enters into the glass, that is the transmittance which considers the surface reflection at the glass surface as well; and "internal transmittance" which will be described in below refers to the transmittance in case there is no surface reflection at the glass surface (that is, the transmittance of the glass itself constituting the glass). Each transmittance can be obtained by measuring the transmission spectrum using the spectrophotometer.

$\beta OH$ expressed in the above mentioned equation (1) means the absorbance caused by hydroxide group. Therefore, by evaluating $\beta OH$, the concentration of the water (and/or the hydroxide ion, hereinafter it may be simply referred as "water") comprised in the glass. That is, the higher the $\beta OH$ is, the higher the water content in the glass is.

In general, $\beta OH$ of the glass differs depending on the glass composition or the production condition or so. For example, in case the glass is produced by the same production condition, the glass having the glass composition which easily takes in the water tends to have higher $\beta OH$ compared to the glass composition which scarcely takes in the water. Also, when compared with the same glass composition, $\beta OH$ tends to be higher by carrying out the procedure to increase the water content in the molten glass.

Therefore, when evaluating whether the water content in the glass has been increased or not for the glass obtained by the production method of the present embodiment, it is necessary to compare with the one having about the same easiness of taking the water in.

The value of $\beta OH$ of the glass in the production of the present embodiment is not particularly limited, as long as it can be adjusted, however from the point of enhancing the effect of color reduction of the glass or the reduction of the noble metal content in the glass, the higher the value of $\beta OH$ is, the more preferable it is.

Particularly, from the point of improving the transmittance of the glass after the heat treatment, the glass produced by the production method of the present embodiment preferably satisfies the following equation (1-2).

$$\beta OH \geq 0.4891 \times \ln(1/HR) + 2.48 \quad (1\text{-}2)$$

Here, in the above mentioned equation (1-2), "ln" is a natural logarithm. Also, in the above mentioned equation (1-2), HR shows the total amount (mol %) of the content of each component of $TiO_2$, $Nb_2O_5$, $WO_3$ and $Bi_2O_3$ in said glass. Also, the unit of $\beta OH$ is $mm^{-1}$.

In the production method of the present embodiment, the procedure of increasing the water content in the molten glass is preferably carried out until $\beta OH$ of the obtained glass satisfies the above mentioned equation (1-2). Thereby, the coloring reduction effect of the glass after the heat treatment of the obtained glass can be further enhanced.

Note that, in case the procedure of increasing the water content in the molten glass is not carried out during the melting step (i), the obtained glass tends to fail to satisfy the above mentioned equation (1-2). Therefore, the result of whether the glass satisfies these equations can be an index to determine whether the procedure to increase the water content in the molten glass has been carried out or not.

Also, particularly, from the point of reducing the noble metal content in the glass, the glass produced by the production method of the present embodiment preferably satisfies the following equation (1-3).

$$\beta OH \geq 181.39 \times nd^{-3} - 325.75 \times nd^{-2} + 194.85 \times nd^{-1} - 38.1 \quad (1\text{-}3)$$

Here, in the above mentioned equation (1-3), "nd" is the refractive index of said glass. The unit of $\beta OH$ is $mm^{-1}$.

In the production method of the present embodiment, the procedure to increase the water content in the molten glass is preferably carried out until $\beta OH$ of the obtained glass satisfies the above mentioned equation (1-3). Thereby, even if the melting container is constituted by the noble metal material or so, the oxygen partial pressure in the melting atmosphere is reduced sufficiently, and the reaction between the oxygen in the melting atmosphere and the noble metal material can be prevented effectively, thus the noble metal content in the obtained glass can be further reduced.

Note that, in case the procedure to increase the water content in the molten glass is not carried out during the melting step (i), the obtained glass tends to fail to satisfy the above mentioned equation (1-3). Therefore, the result of whether the glass satisfies these equations can be an index to determine whether the procedure to increase the water content in the molten glass has been carried out or not.

Also, the upper limit of βOH of the glass obtained by the production method of the present embodiment differs depending on the type of the glass and the production condition or so, and it is not particularly limited as long as it can be adjusted. If βOH is increased, the amount of the volatile product from the molten glass tends to increase, hence from the point of suppressing the volatilization from the molten glass, βOH is 10 mm$^{-1}$ or less, preferably 8 mm$^{-1}$ or less, more preferably 6 mm$^{-1}$ or less, even preferably 5 mm$^{-1}$ or less, even further preferably 4 mm$^{-1}$ or less, even more preferably 3 or less, and still even further preferably 2 mm$^{-1}$ or less.

Note that, since the infrared light transmit through even a dark colored glass, thus βOH can be evaluated regardless of the coloring of the glass (regardless of the reduced color). Also, usually, since the heat treating step (iv) is carried out under a lower temperature than the softening point of the glass, the value of βOH of the glass does not substantially change before and after thereof, thus it may be measured any time before and after the heat treating step (iv). Therefore, βOH of the glass can be measured by any of the transparent glass after the heat treating step (iv), and the glass with dark color which has not gone through the heat treating step (iv).

The refractive index nd of the glass obtained by the glass production method of the present embodiment is preferably 1.75 or more. Also, the preferable lower limit of the refractive index nd is 1.80, more preferably 1.85, and particularly preferably 1.90. Also, the upper limit of the refractive index nd is not particularly limited as long as the glass is obtained, and for example it may be 2.5 or so. By constituting the optical system using the optical element made of glass with high refractive index, the optical system can be made more compact, and can have high performance. From such point of view, the higher the refractive index nd is, the more preferable it is. However, when the refractive index is raised, a devitrification resistance of the glass tends to decline. Therefore, from the point of maintaining the devitrification resistance, the preferable upper limit of the refractive index nd is 2.4, and more preferably 2.3.

Regarding the Glass Composition

Hereinafter, unless mentioned otherwise, the content of the glass component, total content, the content of the additive will be expressed in mol % in terms of oxides.

The glass obtained by the production method of the present embodiment comprises at least one oxide (hereinafter, it may be simply referred as "high refractive index component") selected from $TiO_2$, $Nb_2O_5$, $WO_3$ and $Bi_2O_3$ as the glass component. Preferably, the total content of $TiO_2$, $Nb_2O_5$, $WO_3$ and $Bi_2O_3$ included in the glass is 20% or more, more preferably 25% or more, further preferably 30% or more, and even further preferably 35% or more. If the total content of $TiO_2$, $Nb_2O_5$, $WO_3$ and $Bi_2O_3$ exceeds 85%, then the devitirification resistance tends to deteriorate, thus from the point to maintain the devitrification resistance, the total content of $TiO_2$, $Nb_2O_5$, $WO_3$ and $Bi_2O_3$ is preferably 85% or less, more preferably 80% or less, and further preferably 75% or less.

From the point of increasing the content of $TiO_2$, $Nb_2O_5$, $WO_3$ and $Bi_2O_3$ in the glass, in the production method of the present embodiment, the obtained glass is preferably $P_2O_5$ containing glass. In $P_2O_5$ containing glass, the moving speed of H+ during the heat treatment is fast, thus the coloring can be reduced by the heat treatment of short time compared to other composition type.

The glass obtained by the production method of the present embodiment is preferably phosphate glass comprising the high refractive index component. That is, as the glass component, it is preferably the oxide glass comprising $P_2O_5$ and at least one oxide selected from $TiO_2$, $Nb_2O_5$, $WO_3$ and $Bi_2O_3$.

As for such glass, the glass wherein the content of $P_2O_5$ is larger than the content of $SiO_2$ and is larger than the content of $B_2O_3$; and the glass wherein the content of $P_2O_5$ is larger than the total content of $SiO_2$ and $B_2O_3$ in terms of mol % expression, may be mentioned.

The present embodiment can be used for the glass composition comprising the known composition wherein the content of $TiO_2$, $Nb_2O_5$, $WO_3$ and $Bi_2O_3$ are within the above mentioned range, in addition to the composition shown in the examples.

Next, the preferable glass composition of the present embodiment will be explained.

$P_2O_5$ is the glass network forming component, and it has the function to maintain the thermal stability of the glass. If the content of $P_2O_5$ is less than 7%, the thermal stability tends to decline, thus preferably the content of $P_2O_5$ is 7% or more. By having 7% or more of the content of $P_2O_5$ included in the glass, the water content in the glass can be increased, and as a result, when the glass is heat treated in the oxidizing atmosphere, the effect of reducing the color can be easily enhanced even more.

On the other hand, if the content of $P_2O_5$ is larger than 40%, the refractive index declines. By having 40% or less of the content of $P_2O_5$ included in the glass, the refractive index of the optical glass obtained by heat treating the glass in the oxidizing atmosphere can be maintained high.

Therefore, the content of $P_2O_5$ is preferably within 7 to 40%. Note that, the lower limit of the content of $P_2O_5$ is 10%, more preferable lower limit is 12%, further preferable lower limit is 15%, and even more preferable lower limit is 18%. The preferable upper limit of the content of $P_2O_5$ is 35%, more preferable upper limit is 33%, further preferable upper limit is 30%, and even more preferable upper limit is 28%.

$SiO_2$ is difficult to be dissolved into the glass of $P_2O_5$ based composition, and if it is introduced in a large amount, then undissolved residue will be generated hence the uniformity of the glass tends to be deteriorated. Therefore, the content of $SiO_2$ is preferably less than the content (M) of $P_2O_5$. As for the relationship between the content of $SiO_2$ and the above mentioned M (the content (%) of $P_2O_5$), the more preferable content of $SiO_2$ is 0% to 0.8×M [%], and further preferable range is 0% to 0.5×M [%], even preferable range is 0% to 0.3×M [%], and even more preferable range is 0% to 0.15×M [%].

$B_2O_3$ function to improve the devitrification resistance by just comprising a small amount. As for the relationship between the content of $B_2O_3$ and the above mentioned M (the content (%) of $P_2O_5$), the preferable content range of $B_2O_3$ is 0% or more and less than M [%], more preferable range is 0% to 0.9×M [%], further preferable range is 0% to 0.7×M [%], even preferable range is 0% to 0.6×M [%], even more preferable range is 0% to 0.5×M [%], even further preferable range is 0% to 0.4×M [%], and still even more preferable range is 0% to 0.35×M [%].

$TiO_2$, $Nb_2O_5$, $WO_3$ and $Bi_2O_3$ increases the refractive index, also functions to increase the dispersion, and are components functions to improve the chemical durability.

However, if the contents of $TiO_2$, $Nb_2O_5$, $WO_3$ and $Bi_2O_3$ respectively become large, the devitrification resistance tends to deteriorate.

From the point of maintaining the devitrification resistance, the upper limit of the content of $TiO_2$ is 40%, more preferable upper limit is 35%, further preferable upper limit is 33%, and even more preferable upper limit is 30%. From the point of obtaining introduction effect of $TiO_2$, the preferable lower limit of the content of $TiO_2$ is 1%, and more preferable lower limit is 3%. The content of $TiO_2$ can be 0% as well.

From the point of maintaining the devitrification resistance, the preferable upper limit of the content of $Nb_2O_5$ is 45%, more preferable upper limit is 40%, and more preferable upper limit is 35%. From the point of obtaining the introduction effect of $Nb_2O_5$, the preferable lower limit of the content of $Nb_2O_5$ is 5%, more preferable lower limit is 8%, and further preferable lower limit is 11%. The content of $Nb_2O_5$ can be 0% as well.

The preferable range of the content of $WO_3$ is 0 to 30%. From the point of obtaining the introduction effect of the above mentioned $WO_3$, the preferable lower limit of the content of $WO_3$ is 1%, more preferable lower limit is 3%, and further preferable lower limit is 5%. On the other hand, from the point of obtaining the devitrification resistance, the preferable upper limit of the content of $WO_3$ is 27%, more preferable upper limit is 24%, further preferable upper limit is 20%, and even more preferable upper limit is 18%. The content of $WO_3$ can be 0% as well.

The preferable range of the content of $Bi_2O_3$ is 0 to 35%. From the point of obtaining the introduction effect of the above mentioned $Bi_2O_3$, the preferable lower limit of the content of $Bi_2O_3$ is 1%, more preferable lower limit is 3%, and further preferable lower limit is 5%. On the other hand, from the point of obtaining the devitrification resistance, the preferable upper limit of the content of $Bi_2O_3$ is 30%, more preferable upper limit is 28%, and further preferable upper limit is 24%. The content of $Bi_2O_3$ can be 0% as well.

The divalent metal components such as BaO, SrO, CaO, MgO and ZnO or so functions to improve the melting property of the glass, and to reduce the coloring of the glass. Also, if it is an appropriate amount, it functions to improve the devitrification resistance. However, if excessive amount is comprised, the refractive index declines and the devitrification resistance tends to deteriorate; thus the total content of BaO, SrO, CaO, MgO and ZnO is preferably 0 to 40%, and more preferably 0 to 32%. The preferable upper limit of the total content of BaO, SrO, CaO, MgO and ZnO is 30%, more preferable upper limit is 27%, and further preferable upper limit is 25%. The preferable lower limit of the total content of BaO, SrO, CaO, MgO and ZnO is 0.1%, more preferable amount is 0.5%, and further preferable lower limit is 1%.

Among these divalent metal components, the content of BaO is preferably within the range of 0 to 40%, and more preferably within 0 to 32% since BaO is an effective component to maintain the high refractive index. The preferable upper limit of the content of BaO is 30%, more preferable upper limit is 27%, and further preferable upper limit is 25%. The preferable lower limit of the content of BaO is 0.1%, more preferable lower limit is 0.5% and further preferable lower limit is 1%. The content of BaO can be 0% as well.

The alkali metal oxides such as $Li_2O$, $Na_2O$ and $K_2O$ or so functions to improve the melting property of the glass, and reduces the coloring of the glass. Also, it functions to reduce the glass transition temperature and the softening temperature, and functions to lower the heat treating temperature of the glass as well. However, if excessive amount is comprised, the refractive index declines, and the devitrification resistance tends to deteriorate, hence the total content of $Li_2O$, $Na_2O$ and $K_2O$ is preferably 0 to 40%, more preferably 0 to 35%, further preferably 0 to 32%, and even more preferably 0 to 30%. The content of $Li_2O$, $Na_2O$ and $K_2O$ can be 0% as well.

Particularly, in case of using $Li_2O$ as the alkali metal oxide, from the point of obtaining the high refractive index glass, the content thereof in the produced glass is more than 0% and less than 10%, more preferably more than 0% and 9% or less, and particularly preferably more than 0% and 8% or less.

$Al_2O_3$ function to improve the devitrification resistance if it is a small amount, however if excessive amount is comprised, then the refractive index declines. Therefore, the preferable range of the content of $Al_2O_3$ is 0 to 12%, more preferable range is 0 to 7%, and further preferable range is 0 to 3%.

$ZrO_2$ function to enhance the refractive index, and if it is a small amount, it functions to improve the devitrification resistance. However, excessive amount is comprised, the devitrification resistance and the melting property tends to deteriorate; thus the preferable range of the content of $ZrO_2$ is 0 to 16%, more preferable range is 0 to 12%, further preferable range is 0 to 7%, and even more preferable range is 0 to 3%.

$GeO_2$ function to maintain the devitrification resistance, and to enhance the refractive index. Also, although $GeO_2$ function to enhance the refractive index, unlike $TiO_2$, $Nb_2O_5$, $WO_3$ and $Bi_2O_3$, it does not increase the coloring of the glass. However, it is extremely expensive component compared to other components, thus the lesser the content of $GeO_2$ is, the better it is from the point of reducing the production cost of the glass. Therefore, in order to widely spread the high refractive index glass product, it is demanded to provide the refractive glass with excellent transmittance while reducing the content of $GeO_2$. According to the present embodiment, by having 20% or more of the total content of $TiO_2$, $Nb_2O_5$, $WO_3$ and $Bi_2O_3$, a high refractive index glass with excellent transmittance can be provided without using large amount of $GeO_2$.

From the point of as such, the preferable range of the content of $GeO_2$ is 0 to 10%, more preferable range is 0 to 5%, further preferable range is 0 to 3%, even more preferable range is 0 to 2%, even further preferable range is 0 to 1%, and even furthermore preferable range is 0 to 0.5%; and $GeO_2$ may not be comprised. Note that, if the production cost is not to be concerned, it can be suitably used in an effective amount.

$TeO_2$ maintain the devitrification resistance while functioning to improve the refractive index. However, from the point of an environmental concern, the preferable range of the content of $TeO_2$ is 0 to 10%, more preferable range is 0 to 5%, further preferable range is 0 to 3%, even more preferable range is 0 to 2%, even further preferable range is 0 to 1%, and even furthermore preferable range is 0 to 0.5%; and $TeO_2$ may not be comprised.

$Sb_2O_3$ has oxidizing effect, and it function to suppress the reduction of $TiO_2$, $Nb_2O_5$, $WO_3$ and $Bi_2O_3$. Therefore, conventionally, in order to suppress the reduction of the high refractive index component during the melting, antimony oxide were added. However, $Sb_2O_3$ itself has an absorption in the visible range, and facilitate the dissolving of the noble metal ions to the molten glass by oxidizing the melting container made of noble metal due to this oxidizing effect; thus it causes the coloring of the obtained glass at the end.

Therefore, the glass production method of the present embodiment preferably prepares the glass raw material so that the content of antimony oxide in terms of $Sb_2O_3$ in the obtained glass is less than 1000 ppm. According to the glass production method of the present embodiment, the coloring of the glass obtained by heat treating the glass under the oxidizing atmosphere can be made small without using the oxidizing effect of the antimony oxide.

Therefore, the preferable range of the content of $Sb_2O_3$ is 0 ppm or more and less than 1000 ppm. From the above mentioned point of view, the upper limit of the content of $Sb_2O_3$ is 900 ppm, 800 ppm, 700 ppm, 600 ppm, 500 ppm, 400 ppm, 300 ppm, 200 ppm, 100 ppm in this order, and the smaller the value is the more preferable it is. $Sb_2O_3$ may not be comprised.

If the component other than the above mentioned components is comprised in a large amount, the devitrificaton resistance of the glass deteriorates, and the liquid temperature tends to increase. Therefore, the glass melting temperature must be increased, and an erosion of the melting container made of noble metal increases, thus the amount of the noble metal dissolving into the glass increases. Also, the reduced color of $TiO_2$, $Nb_2O_5$, $WO_3$ and $Bi_2O_3$ increases as well.

From the point of suppressing the increase of such noble metal amount and to suppress the coloring of the glass, the total amount of $P_2O_5$, $SiO_2$, $B_2O_3$, $TiO_2$, $Nb_2O_5$, $WO_3$ and $Bi_2O_3$, MgO, CaO, SrO, BaO, ZnO, $Li_2O$, $Na_2O$, $K_2O$, $Al_2O_3$, $ZrO_2$, $GeO_2$, $TeO_2$ and $Sb_2O_3$ are preferably 90% or more, more preferably 92% or more, further preferably 95% or more, even more preferably 96% or more, even further preferably 97% or more, still more preferably 98% or more, and yet more preferably more than 99%. Note that, the total content of the above mentioned may be 100%.

$Ta_2O_5$, $Y_2O_3$, $La_2O_3$, $Gd_2O_3$, $Yb_2O_3$, $In_2O_3$, $Ga_2O_3$, $SnO_2$, $CeO_2$ and F or so may be comprised in a small amount. The total content of $Ta_2O_5$, $Y_2O_3$, $La_2O_3$, $Gd_2O_3$, $Yb_2O_3$, $In_2O_3$, $Ga_2O_3$ and F is preferably 0 to 10%, more preferably 0 to 7%, further preferably 0 to 5%, even more preferably 0 to 3%, even further preferably 0 to 1%, and still more preferably 0 to 0.5%.

F is a component which should not be included in a large amount from the point of increasing the volatility of the molten glass to obtain a uniform glass, and to obtain the glass comprising the stable optical characteristic. The preferable range of the content of F is 0 to 3%, more preferable range is 0 to 1%, further preferable range is 0 to 0.5%; and it is even more preferable to be substantially free of F.

From the point of reducing the environmental load, it is preferable to substantially be free of Pb, As, Cd, U, Th and Tl.

From the point of reducing the coloring of the glass, it is preferably substantially free of the additives and the components which have absorbance in the visible range such as Cu, Cr, Mn, Fe, Co, Ni, V, Mo, Nd, Eu, Er, Tb, Ho, Pr or so.

Note that, in the glass production method of the present embodiment, the inevitable impurities are not excluded. Therefore, for the above mentioned components, it is most preferable that the used amount in the glass raw material is completely zero; however it is sufficiently preferable even if the used amount is substantially zero; that is in case the trace amounts are mixed in the glass raw material inevitably as the impurities.

Note that, as the glass raw material, depending on the glass components, the known glass raw material can be used such as oxides, phosphoric acid, phosphates (polyphosphate, metaphosphate, pyrophosphate or so), boric acid, boric anhydride, carbonates, nitrates, sulfates, hydroxides or so.

The Production of the Optical Element

The use of the glass obtained by the production method of the present embodiment is not to be limited, and for example it can be suitably used as the optical glass. In order to make the optical element using the optical glass produced by the production method of the present embodiment, the known methods can be used. For example, the molten glass is molded to produce the glass material for press-molding. Next, this glass material is re-heated, and press molded to produce the optical element blank. Further, the optical element is produced by processing by the step including the polishing of the optical element blank.

Alternatively, the molten glass is molded to produce the glass material for press-molding, and this glass material is heated and the precision press-molding is carried out to produce the optical element.

In the above mentioned each step, the molten glass is molded to produce the glass mold product, and the glass mold product is processed to produce the glass material for press-molding.

Alternatively, the molten glass is molded to produce the glass mold product, and this glass mold product is processed to produce the optical element.

To the optical function face of the produced optical element, anti-reflection film, total reflection film or so may be coated depending on the purpose of the use.

As for the optical element, various lenses such as spherical lenses, macro lenses, lens array or so, prism, diffraction gratings or so may be mentioned as examples.

The Production Method of the Optical Glass

Hereinafter, as other embodiment of the present embodiment, the production method of the optical glass will be explained. Note that, the production method of the below optical glass is merely one preferable embodiment, and the glass production method of the present invention is not to be limited to the production method of the optical glass of the following.

For the production method of the optical glass according to the present embodiment, the optical glass material produced by the glass production method of the above mentioned first embodiment and/or the glass production of the second embodiment at least under goes the heat treating step (iv) in the oxidizing atmosphere to produce the optical glass having the refractive index nd of 1.9 or more.

In the following, "the optical glass material" is the glass produced via the molding step which molds the molten glass in the melting container to a predetermined shape, and refers to the glass having dark coloring of before the heat treatment. Also, "the optical glass" refers to the glass of which the optical glass material having dark color is heat treated. That is, "the optical glass" is the glass wherein the color is reduced than "the optical glass material" by carrying out the heat treatment. Also, "the optical glass material" and "the optical glass", and "the glass material for press-molding", "the optical glass" and "other optical glass product" produced by "the optical glass material" or "the optical glass" is glass having the amorphous form, and it is not crystalline glass.

Here, as the oxidizing atmosphere gas, it only needs to be a gas including oxygen, and the oxygen concentration is for example as same as the air or higher than air. For example, as such oxidizing atmosphere gas, air, gas added with oxygen to the air, and gas substantially only consisting of oxygen or so may be mentioned. Also, the heat treatment temperature and the heat treatment time may be set accordingly so that the desired optical characteristic can be obtained.

Note that, the optical glass obtained via the heat treating step has high transparency and little coloring, thus the water included in the optical glass can be quantitatively determined by the spectrophotometry as the infrared absorbance due to OH⁻.

Also, the optical glass is obtained by carrying out the heat treatment to the optical glass material in the oxidizing atmosphere, hence it is obvious that the water content in the optical glass is proportional or is strongly correlated with the water content in the molten glass when producing the optical glass material.

Therefore, by determining the value of the water content in the optical glass, it becomes extremely easy to determine the suitable production condition for producing the optical glass material, that is the supplying method and the supplying amount of the water into the melting container, the type of the material and the blending amount (particularly, the blending amount of the phosphoric acid component) used as the glass raw material or so. Therefore, the optical characteristic (particularly, the transmittance) and the water content of the optical glass are measured and determined, and the suitable production condition for producing the optical glass material can be easily determined based on this result.

Note that, the water content in the optical glass can be determined for example by βOH shown in the above mentioned formula (1).

Figure 2:
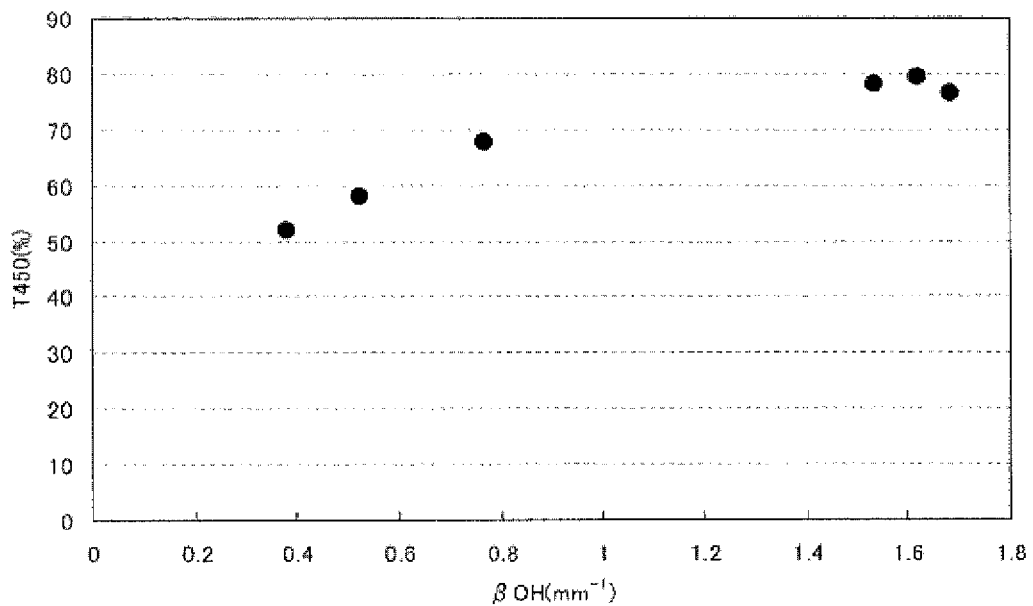
FIG. 2 is a graph showing the change of the external transmittance (T450) at the wavelength of 450 nm when the light enters parallel to the thickness direction of the optical glass having the thickness of 5 mm with respect to βOH value when βOH value of the optical glass is changed from the composition of No. 1 in Table 1.

FIG. 2 is the graph showing the change of the external transmittance (T450) at the wavelength of 450 nm when the light enter the optical glass having the thickness of 5 mm parallel to the thickness direction thereof, with respect to βOH value, in case the βOH of the optical glass made of the composition of No. 1 shown in Table 1 is varied.

The optical glass made of the composition of No. 1 used for the measurement of the graph shown in Table 2 has carried out with the heat treatment for 1 hour at 600° C. in the air to the optical glass material made of the composition of No. 1.

Figure 3:
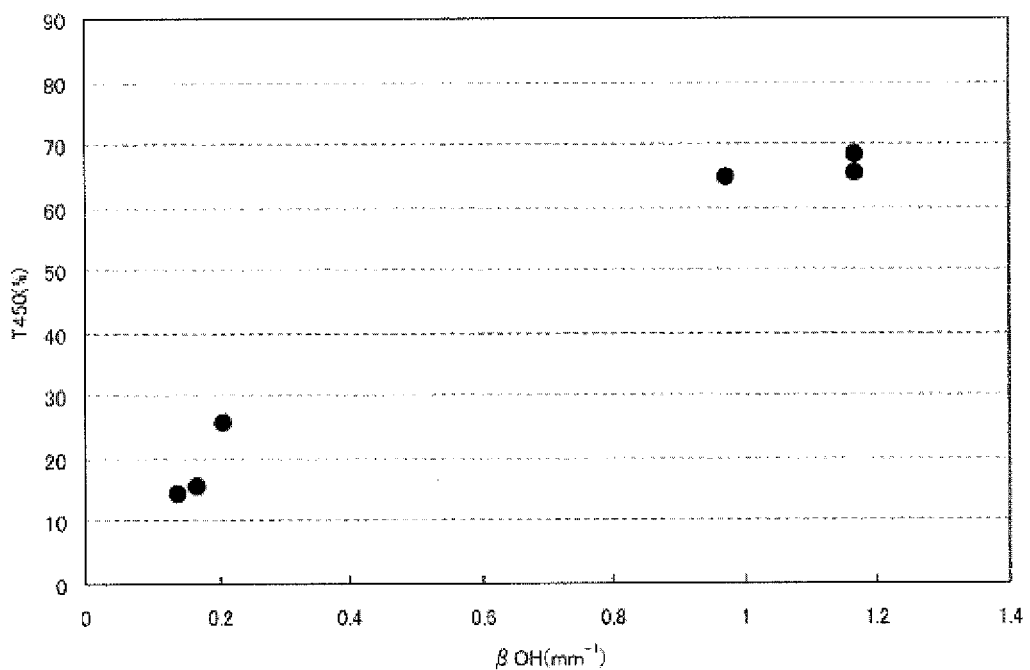
FIG. 3 is a graph showing the change of the external transmittance (T450) at the wavelength of 450 nm when the light incidence is parallel to the thickness direction of the optical glass having the thickness of 5 mm with respect to βOH value when βOH value of the optical glass is changed from the composition of No. 3 of the Table 1.

Also, FIG. 3 is a graph showing the change of the external transmittance (T450) at the wavelength of 450 nm when the light enter to the optical graph of the thickness of 5 mm parallel to the thickness direction thereof, with respect to βOH value, in case βOH of the optical glass made of the composition of No. 3 shown in Table 1 is varied. The optical glass made of the composition of No. 2 used for the measurement of the graph shown in FIG. 3 has carried out with the heat treatment for 4.5 hours at 570° C. in the air using the optical glass material made of the composition of No. 2.

Also, βOH value, the refractive index nd and Abbe number vd shown in FIG. 2, FIG. 3 and Table 1 are the values measured under the state of optical glass of after the heat treatment. Also, the glass composition of No. 1 to No. 4 shown in Table 1 has the total content of $TiO_2$, $Nb_2O_5$, $WO_3$ and $Bi_2O_3$ of 30 mol % or more, and comprises $P_2O_5$.

TABLE 1

| Glass component (mol %) | No. 1 | No. 2 | No. 3 | No. 4 |
|---|---|---|---|---|
| $P_2O_5$ | 25.43 | 23.43 | 22.579 | 25.5 |
| $B_2O_3$ | 4.07 | 4.45 | 2.826 | 2.0 |
| $SiO_2$ | 1.18 | 1.29 | 1.613 | 0 |
| $TiO_2$ | 26.6 | 15.5 | 18.148 | 7.0 |

TABLE 1-continued

| Glass component (mol %) | No. 1 | No. 2 | No. 3 | No. 4 |
|---|---|---|---|---|
| $Nb_2O_5$ | 25.04 | 24.74 | 16.535 | 18.0 |
| $WO_3$ | 0 | 0 | 14.515 | 8.0 |
| $Bi_2O_3$ | 0 | 0 | 20.966 | 20.0 |
| $Li_2O$ | 0 | 0 | 0 | 6.0 |
| $Na_2O$ | 10.28 | 4.99 | 0 | 10.5 |
| $K_2O$ | 6.01 | 2.46 | 0 | 2.0 |
| BaO | 1.39 | 21.24 | 2.818 | 1.0 |
| ZnO | 0 | 1.9 | 0 | 0 |
| Total | 100 | 100 | 100 | 100 |
| $TiO_2 + N_2O_5 + WO_3 + Bi_2O_3$ | 51.64 | 40.24 | 70.164 | 53.0 |
| Refractive index nd | 1.9546 | 1.922 | 2.10639 | 2.003 |
| Abbe number vd | 17.9 | 20.9 | 17.01 | 19.1 |
| Glass transition temperature Tg (° C.) | — | — | 562.5 | 486 |
| Liquidus temperature LT(° C.) | 1100 | 1080 | 970 | 920 |

Further, βOH values of the plurality points shown in FIG. 2 is the value set by adjusting the amount of the water vapor per unit time when introducing the water vapor nearby the liquid surface of the molten glass, during the production of the optical glass material. Here, all the production conditions are the same except for the amount of the water vapor. That is, due to the increase and the decrease of the amount of the water vapor, βOH value is increased and decreased. Note that, this applies to βOH values of the plurality points shown in FIG. 3. As obvious from FIG. 2 and FIG. 3, the external transmittance (T450) increases together with the increase of βOH value.

As mentioned in above, if the optical characteristic (particularly, the transmittance) and the water content of the optical glass are measured and determined, then based on these results, the suitable production condition for producing the optical glass material can be easily determined.

Not that, the coloring degree of the optical glass can be quantified by λτ80 which is the indicator to show the coloring degree. λτ80 refers to the wavelength (nm) wherein the internal transmittance (internal transmittance τ) is 80% which is calculated first by measuring the internal transmittance at the range of the wavelength 280 to 700 nm when the light enter into the optical glass parallel to the thickness direction thereof, then assuming that the thickness of the optical glass based on the internal transmittance measured thereby is 10 mm. In other words, within the wavelength range having λτ80 or more in the wavelength of 280 to 700 nm, the internal transmittance at the thickness of 10 mm is 80% or more. Here, the internal transmittance τ is the transmittance excluding the surface reflection loss at the incident side and the emitting side; and is a value obtained by measuring the transmittance T1, T2 including the surface reflection loss of each sample using two samples with different thickness, that is by carrying out the measurement of the external transmittance T1, T2 within the wavelength range of 280 nm to 1550 nm, and calculated based on the following equation using these measured value.

$$\text{Log } \tau = -(\log T1 - \log T2) \times 10 / \Delta d \quad (2)$$

Here, in the equation (2), T1 is the transmittance (%) including the surface reflection loss measured in the wavelength range of 280 nm to 1550 nm when the light enters parallel to the thickness direction of first sample, wherein the thickness of the first sample is d1 (mm). T2 is the transmittance (%) including the surface reflection loss measured in the wavelength range of 280 nm to 1550 nm when the light enters parallel to the thickness direction of second sample, wherein the thickness of the second sample is d2 (mm) made of same glass as the first sample. Note that, λτ80 is calculated using the result of the transmittance measurement at the wavelength of 280 to 700 nm, thus the measurement of the transmittance T1 and T2 may be carried out within the wavelength range of 280 to 700 nm. Also, Δd is the difference d2−d1 (mm) between the thickness d1 and the thickness d2; and the thickness d1 and the thickness d2 satisfies the relation of d1<d2.

λτ80 increases as the total content of $TiO_2$, $Nb_2O_5$, $WO_3$ and $Bi_2O_3$ increases. In case the total content of $TiO_2$, $Nb_2O_5$, $WO_3$ and $Bi_2O_3$ in mol % expression is X, when the optical glass is produced by heat treating the optical glass material without increasing the water content in the optical glass material prior to the heat treatment in the oxidizing atmosphere, X and λτ80 satisfies the below equation (3). Therefore, it is difficult to drastically improve λτ80.

$$\lambda\tau 80 > aX + b \quad (3)$$

Note that, in the equation (3), "a" is the constant (1.8359 nm/mol %), and "b" is the constant (351.06 nm).

On the other hand, in the production method of the optical glass of the present embodiment, the heat treating step is carried out by using the optical glass material having high water content, thus the below equation (4) is easily satisfied. Here, for the heat treating temperature and the heat treating time during the heat treating step can be set accordingly to satisfy the equation (4).

$$\lambda\tau 80 < aX + b \quad (4)$$

Note that, in the equation (4), "a" and "b" are the same as the equation (3).

Note that, λτ80 of the optical glass preferably satisfies the below equation (5), and further preferably satisfies the equation (6). In this case, by setting the heat treating temperature and the heat treating time during the heat treating step accordingly, the optical glass satisfying the below equation (5) and equation (6) can be produced.

$$\lambda\tau 80 < aX + c \quad (5)$$

$$\lambda\tau 80 < aX + d \quad (6)$$

Here, in the equation (5), "a" is the same as the equation (3), and "c" is the constant (348.06 nm). Also, in the equation (6), "a" is the same as the equation (3), and "d" is the constant (345.06 nm).

Also, by at least going through the heat treating step (the heat treating step to reduce the coloring) carried out in the oxidizing atmosphere (for the purpose of reducing the coloring of the optical glass material), by using the produced optical glass material, the press molding glass material or the optical element including the optical glass having the refractive index of 1.9 or more can be produced as well. Here, the subsequent steps carried out depending on other needs besides the heat treating step for reducing the coloring; for example, various known steps such as molding step by introducing into the press or the mold, the grinding step, the polishing step, the heat treating step (excluding the heat treating step for reducing the coloring) can be carried out accordingly before or after the heat treating step for reducing the coloring.

Note that, the glass material for press-molding is the glass material for obtaining the press mold product, specifically the optical element blank or the optical elements. As for the production method of the glass material for press-molding, for example (1) the method wherein the molten glass flow draining out is separated to form the molten glass bulk, and this molten glass is molded to be the optical glass material having the same shape and size as the glass material for press-molding which is obtained at the end during the cooling process, then carrying out the heat treating step to this optical glass material for the reducing the coloring thereby obtaining the glass material for press-molding; or (2) the method wherein the molten glass is introduced into the mold to form the glass block (the optical glass material), then producing the glass material for press-molding by carrying out the subsequent processing steps to this glass block including heat treating step for reducing the coloring or so may be mentioned.

As for the example of the optical element, various lenses such as the spherical lenses, non-spherical lenses, and prism or so may be mentioned. As for the production method of the optical element, for example the below described (1) to (3) may be mentioned. (1) the method wherein optical glass (or the glass material for press-molding) is produced by carrying out the heat treating step to the optical glass material for reducing the coloring, then producing the optical element blank by heating, softening and press-molding this optical glass (or the glass material for press-molding), and at the end processing this optical element blank to produce the optical element. (2) The method wherein the glass material for press-molding is produced from the optical glass material, then heating, softening and precision-molding this glass material for press-molding thereby producing the optical element. (3) the method press-molding the molten glass to produce the optical element blank, and while producing the optical element by processing this optical element blank, carrying out the heat treating step for reducing the coloring before or after the processing of the optical element blank.

Hereinabove, the embodiment of the present invention has been explained; however the present invention is not to be limited thereto, and within the range which does not exceed the scope of the present invention, various embodiment can be carried out.

In the embodiment of the present invention, the optical glass is used as the example, however as long as it is a glass product of which the coloring due to the reducing component causes problem, it can be suitably used for the production of various glass product not only for the optical elements. As for such glass product, for example, optical window material, solar battery glass, cover glass or so may be mentioned.

Also, the glass according to the present embodiment is suitable as the material for the optical element, thus it is preferably an amorphous glass. As the method of producing the optical element made of glass, for example the method of heating, softening and molding the glass material may be mentioned. The crystalline glass wherein the crystalline phase is dispersed in the vitreosity is not suitable for the molding method of the above mentioned. Also, the crystalline phase of the crystalline glass scatters the light, and it may lower the performance as the optical element. As for the amorphous glass, there is no such problem.

Also, the present embodiment mentions the method of melting the raw material using mainly the crucible as one example for the production method of the optical glass, however as for the melting container, the tube made of quartz or so and with opened both ends or so may be used.

Specifically, in the glass melting furnace, the tube made of quartz is fixed by being inclined. At the bottom part of the glass melting furnace, the opening part is provided to the position corresponding to the lower part of the opening end of the lower position side of the tube. The raw material (the batch raw material or the cullet) is introduced into the tube from the opening end of the higher position side of the tube, then melt (or dissolve) inside the tube, thereby forms the molten material. The molten material slowly flows inside of the tube, and flows out from the opening side of the lower position side of the tube.

For example, during the rough melting step, the flowing product passes through the opening part of the bottom of the furnace, and is dropped in to the water of the water tank placed in advance at the lower side of the opening part of the bottom part of the glass melting furnace, thereby forms the cullet.

In the above mentioned method, the raw material is melted using the tube made of the quartz, however instead of the tube, the crucible made of quarts or so may be used as well. First, the raw material is placed inside the crucible made of quartz, and heated and melted to form the molten material, then the molten material may be casted in the water, or drained out on to the heat resistance board which has been cooled thereby the cullet may be produced.

EXAMPLES

Hereinafter, the present invention will be described based on the examples; however the present invention is not to be limited thereto.

Example 1

[The Preparation of the Batch Raw Material]

First, for producing the optical glass comprising the desired characteristics, phosphoric acid, barium metaphosphate, titanium oxide, niobium oxide, tungsten oxide, bismuth oxide, boric acid, barium carbonate, sodium carbonate, potassium carbonate and silicon oxide were prepared as the glass raw material. Next, the above mentioned raw materials were accordingly selected, scaled and thoroughly mixed so that the glass composition of the optical glass which will be obtained at the end satisfies the oxide composition I to VIII shown in Table 2, thereby the batch raw materials I to VIII were produced.

TABLE 2

| Glass component | Oxide composition (mol %) | | | | | | | |
| --- | --- | --- | --- | --- | --- | --- | --- | --- |
| | I | II | III | IV | V | VI | VII | VIII |
| $P_2O_5$ | 19.8 | 21.6 | 23.6 | 24.6 | 25.7 | 30.4 | 22.6 | 21.5 |
| $TiO_2$ | 11.3 | 17.0 | 11.8 | 19.3 | 26.7 | 21.2 | 18.2 | 21.2 |
| $Nb_2O_5$ | 21.9 | 15.0 | 29.3 | 28.2 | 26.3 | 20.6 | 16.5 | 19.3 |
| $WO_3$ | — | — | — | — | — | 9.0 | 14.5 | 9.4 |
| $Bi_2O_3$ | — | — | — | — | — | 10.1 | 20.9 | 24.5 |
| $B_2O_3$ | 15.1 | 10.7 | 6.2 | 5.0 | 3.8 | 1.9 | 2.8 | 2.4 |
| BaO | — | 17.0 | 22.1 | 12.1 | 1.5 | 2.1 | 2.8 | 1.7 |
| $Na_2O$ | 27.2 | 13.6 | 7.0 | 5.0 | 10.0 | 3.0 | — | — |
| $K_2O$ | 4.7 | 5.1 | — | 5.8 | 6.0 | 1.7 | — | — |
| $SiO_2$ | — | — | — | — | — | — | 1.6 | — |

[The Production of the Cullet and the Mixed Cullet (the Rough Melting Step)]

The batch raw materials I to VIII being mixed was made as the glass raw material of each optical glass. This glass raw material was introduced into the crucible made of quartz, and melted at 900 to 1350° C. in the air atmosphere, thereby obtained the molten material. The molten material obtained as such was dropped into the water to obtain the cullet.

The cullet which was taken out of the water was dried, and a part of the cullet was sampled for the refractive index measurement, and melted by placing in the crucible made of platinum, then refined the obtained glass melting liquid and was made uniform. Then, it was introduced in the mold for molding, and maintained at the temperature near the glass transition temperature, then cooled at the temperature decreasing speed of 30° C./hour. The refractive index nd of the refractive index measurement sample obtained as such was measured by the refractive index measurement method in accordance with Japan Optical Glass Industry Society Standard.

Next, depending on the measured refractive index nd, the cullet was prepared so that it satisfies the desired refractive index, thereby obtained the mixed cullet for the production of the optical glass.

[The Production of the Optical Glass (Re-Melting Step)]

Next, the mixed cullet was introduced into the crucible made of platinum (melting container), and within the range of 800 to 1350° C., the mixed cullet in the crucible made of platinum was heated and melted to form the molten glass (melting step).

Then, the temperature of the crucible was increased to the refining temperature (900 to 1450° C.) for refining (refining step). Then, the temperature of the crucible was cooled to uniforming temperature, then stirred using the stirring apparatus thereby it was uniformed (uniforming step).

Note that, the volume of the melting furnace (the volume of the space inside the furnace of flame resistant which houses the crucible) and the placement time of the molten material in the melting furnace (the time from the introduction of the cullet to the platinum crucible container until the molten glass flows out from the melting container) are shown in Table 3.

Also, for carrying out the melting step, refining step, uniforming step, the procedure to increase the water content in the molten glass was carried out depending on the needs.

Specifically, the pipe made of platinum was inserted from the outside of the furnace into the crucible made of platinum placed inside the furnace, and the water vapor ($H_2O$ 100 vol %) was supplied to the space inside the crucible made of platinum via this pipe made of platinum. As such, the addition of the water vapor to the melting atmosphere was carried out by adding the water vapor to the air. The flow amount of the supplied water vapor is shown in Table 3.

Also, if necessary, the water vapor ($H_2O$ 100 vol %) was bubbled into the molten material from the tube provided at the lower part of the crucible. As such, the bubbling of the water vapor to into the molten material was carried out by bubbling the water vapor to the molten material in the air atmosphere or to the molten material in the melting atmosphere added with the water vapor to the air. The flow amount of the water vapor supplied is shown in Table 3.

Note that, the flow amount of the water vapor shown in Table 3 is the value converted to the flow amount at the usual temperature and usual pressure, and the unit is littler/min.

Also, in case the water vapor is not supplied, the lid made of platinum was not used, and while the melting container was kept opened, the melting step to the uniforming step via the refining step were all carried out under the air atmosphere.

TABLE 3

| Sample No. | Oxide composition | Volume litter | Placement time hour | Procedure to increase the water content Atmospheric adding flow amount litter/min | bubbling flow amount litter/min |
|---|---|---|---|---|---|
| 11 | I | 40 | 4.5 | — | — |
| 12 | | 93 | 8.6 | — | — |
| 13 | | 40 | 4.5 | 15 | — |
| 14 | | 40 | 4.5 | 40 | — |
| 15 | | 40 | 4.5 | 320 | — |
| 16 | | 40 | 4.5 | 320 | 4 |
| 21 | II | 40 | 4.8 | — | — |
| 22 | | 93 | 9.1 | — | — |
| 23 | | 121 | 9.8 | — | — |
| 24 | | 40 | 4.8 | 40 | — |
| 25 | | 40 | 4.8 | 320 | — |
| 26 | | 40 | 4.8 | 350 | — |
| 31 | III | 40 | 5.5 | — | — |
| 32 | | 93 | 9.7 | — | — |
| 33 | | 40 | 5.5 | 250 | — |
| 34 | | 40 | 5.5 | 300 | — |
| 35 | | 40 | 5.5 | 320 | — |
| 41 | IV | 40 | 5.2 | — | — |
| 42 | | 93 | 9.7 | — | — |
| 43 | | 40 | 5.2 | 10 | — |
| 44 | | 40 | 5.2 | 250 | — |
| 45 | | 40 | 5.2 | 300 | — |
| 46 | | 40 | 5.2 | 320 | — |
| 51 | V | 40 | 7.8 | — | — |
| 52 | | 93 | 9.1 | — | — |
| 53 | | 40 | 4.8 | 15 | — |
| 54 | | 40 | 4.8 | 40 | — |
| 55 | | 40 | 4.8 | 320 | — |
| 56 | | 40 | 4.8 | 320 | 4 |
| 61 | VI | 40 | 6.5 | — | — |
| 62 | | 93 | 9.1 | — | — |
| 63 | | 40 | 6.5 | 15 | — |
| 64 | | 40 | 6.5 | 40 | — |
| 65 | | 40 | 6.5 | 300 | — |
| 66 | | 40 | 6.5 | 320 | — |
| 71 | VII | 40 | 7.3 | 7 | — |
| 72 | | 40 | 7.3 | 7 | — |
| 73 | | 6 | 5.0 | 5 | — |
| 81 | VIII | 40 | 7.3 | — | — |
| 82 | | 40 | 7.3 | 2 | — |
| 83 | | 6 | 5.0 | 12 | — |
| 84 | | 6 | 5.0 | 34 | — |

The molten glass which has been uniformed as such was drained out from the glass draining pipe made of platinum installed to the bottom part of the crucible (the draining step) in the air atmosphere, and by introducing into the mold placed at the lower side of the draining pipe, a long glass block (the width of 150 mm×the thickness of 10 mm) was molded (the molding step).

Then, the above mentioned glass block was increased with the temperature at the speed of +100° C./hour, and maintained for 1.5 to 8 hours at the temperature near each glass transition temperature, then cooled at the speed of −10° C./hour (the annealing step), thereby the optical glass sample removed with the strain was obtained.

[The Evaluation of the Optical Glass]

Each physical properties of the obtained optical glass sample (sample 11 to sample 84) were measured and evaluated as in below.

[1] The Glass Composition

The appropriate amount of the optical glass sample was taken, and treated with acid and alkaline, then using the inductively coupled plasma mass spectrometry method (ICP-MS method) and the ion chromatography method, the content of each component was quantitatively measured to confirm that it matches with the oxide composition I to VIII.

[2] The Refractive Index Nd, Abbe Number νd and the Glass Transition Temperature Tg The molten glass which has gone through the uniforming step when producing the optical glass sample was molded by introducing into the mold, and maintained at the temperature near the glass transition temperature, then cooled at the temperature decreasing speed of 10° C./hour to produce the measuring sample. For the obtained measuring sample, the refractive index nd, ng, nF, nc were measured in accordance with Japan Optical Glass Industry Society Standard. Further, by these measured value of the refractive indexes, Abbe number νd was calculated.

Next, optical glass sample was processed, and the measurement sample of column shape (the diameter of 5 mm and the height of 20 mm) was produced. For the obtained measurement sample, by using the thermomechanical analysis apparatus (TMA) and under the condition of the temperature rising speed of +10° C./min, the glass transition temperature Tg was measured.

Note that, these characteristic values were derived from the glass compositions, thus for the optical glass sample using the same batch raw material as the glass raw material were confirmed to have substantially the same values. The results are shown in Table 4.

TABLE 4

| | Oxide composition | | | | | | | |
|---|---|---|---|---|---|---|---|---|
| | I | II | III | IV | V | VI | VII | VIII |
| Refractive index nd | 1.81 | 1.87 | 1.92 | 1.93 | 1.95 | 2.02 | 2.11 | 2.16 |
| Abbe number νd | 22.5 | 21.8 | 20.9 | 19.2 | 18.0 | 17.8 | 17.0 | 16.2 |
| Glass transition temperature Tg (° C.) | 541 | 604 | 666 | 652 | 637 | 601 | 5.61 | 558 |

[3] βOH

The optical glass sample was processed, and then the plate shaped glass sample having the thickness of 1 mm being optically polished so that the both faces are flat and parallel to each other was prepared. To the polished face of this plate shaped glass sample, the light was entered in vertical direction, then the external transmittance A at the wavelength of 2500 nm, and the external transmittance B at the wavelength of 2900 nm were measured using the spectrophotometer, and βOH was calculated from the below equation (1).

$$\beta OH = -[\ln(B/A)]/t \qquad (1)$$

In the above mentioned equation (1), ln is a natural logarithm, and the thickness t corresponds to the space between the two planar faces of the above mentioned. Also, the external transmittance includes the reflection loss at the glass sample surface, and it is the ratio (the transmitted light intensity/the incident light intensity) of the intensity of the transmitted light against the intensity of the incident light entering to the glass sample. Also, the higher the value of βOH is, the more water is included in the glass. The results are shown in Table 7.

[4] T450 (H)

The optical glass sample was increased with the temperature at the speed of +100° C./hour in the air atmosphere, and maintained for 100 hours at the predetermined maintaining temperature, then the temperature was lowered at the speed of −30° C./hour, thereby the heat treatment was carried out. Note that, the maintaining temperature differs depending on the composition, thus it was set to temperature shown in Table 5 depending on the oxide compositions of each optical glass sample.

TABLE 5

| | Oxide composition | | | | | | | |
|---|---|---|---|---|---|---|---|---|
| | I | II | III | IV | V | VI | VII | VIII |
| Maintaining temperature (° C.) | 530 | 600 | 650 | 630 | 630 | 570 | 550 | 530 |

The optical glass sample carried out with the heat treatment was processed, and then the plate shaped glass sample having the thickness of 10 mm being optically polished so that the both faces are flat and parallel to each other was prepared. For the plate shaped glass sample obtained as such, the external transmittance T450(H) at 450 nm was obtained using the spectrophotometer. The larger the value of T450(H) is, the more excellent the transmittance is, and it means that the coloring of the glass is reduced. The results are shown in Table 7.

[5] Pt Content

An appropriate amount of the optical glass sample was taken, and this was carried out with alkali fusion to separate Pt, then Pt amount in the glass was quantified by ICP-MS method. The results are shown in Table 7.

[6] The Coloring Degree λ80 and λ70

First, the optical glass sample was heat treated under the same condition as T450(H).

The optical glass sample carried out with the heat treatment was processed, and then the plate shaped glass sample having the thickness of 10 mm±0.1 mm being optically polished so that the both faces are flat and parallel to each other was prepared. To the polished face of this plate shaped glass sample, the light entered in a vertical direction, and the spectral transmittance including the surface reflection loss within the range of the wavelength of 280 nm to 700 nm was measured using the spectrophotometer; then the wavelength wherein the spectral transmittance (the external transmittance) becomes 80% and 70% were determined as the coloring degree λ80 and λ70 respectively. The smaller the value of each of λ80 and λ70 are, the lesser the coloring of the glass is. The results are shown in Table 7. Note that, for the sample evaluated for λ80, the underline is shown in the result of Table 7.

[7] T450 (L)

0.5 to 0.7 cc of the molten glass which has gone through the uniforming step during the production of the optical glass sample was taken, and introduced into the concave part of the mold for a float molding (the mold having a structure wherein the concave part receiving the molten glass is formed of porous materials, and the gas was spurted out from the surface of the concave part via the porous material), then the gas spurts out from the concave part and upward gas pressure was applied to the molten glass on the concave part, thereby the glass bulk while floating was produced.

Then, the above mentioned glass bulk was increased with the temperature at the speed of +100° C./hour, and maintained at the predetermined maintaining temperature for predetermined maintaining time, then the temperature was lowered at the speed of −30° C./hour, thereby obtained the spherical optical glass sample of after the heat treatment. Note that, the maintaining temperature and the maintaining time differs depending on the composition, hence the temperature and the time were set as shown in Table 6 depending on the oxides composition of each optical glass sample.

TABLE 6

| | Oxide composition | | | | | | | |
|---|---|---|---|---|---|---|---|---|
| | I | II | III | IV | V | VI | VII | VIII |
| Maintaining temperature (° C.) | 500 | 550 | 650 | 630 | 600 | 600 | 550 | 500 |
| Maintaining time (h) | 2 | 4 | 4 | 4 | 1 | 5 | 5 | 6 |

The obtained spherical optical glass sample was processed, and then the plate shaped glass sample having the thickness of 5 mm being optically polished so that the both faces are flat and parallel to each other was prepared. For the plate shaped glass sample obtained as such, the external transmittance T450(L) at 450 nm was obtained using the spectrophotometer. The larger the value of T450(L) is, the more excellent the transmittance is, and it means that the coloring of the glass is reduced even after the heat treatment of short period of time.

[8] The Defoaming 40 cc of the molten glass (glass molten liquid) before the refining step during the production of the optical glass sample was taken, and was refined for certain period of time by separate platinum crucible, then the glass molten liquid was cooled down in the platinum crucible thereby it was solidified. During this step, the coloring was reduced so that the number of air bubbles included in the glass can be counted. Next, the solidified glass was taken out from the platinum crucible.

The samples for the measurement obtained as such was observed by magnifying (100×) the inside of the glass using the optical microscope (the magnification of 20 to 100×), then the number of bubbles included in the glass was counted. The same observations were carried out to each sample for the measurement sample with different clarifying times, and the refining time of the measurement sample wherein the number of the air bubbles remaining in the glass to be 100/kg were evaluated as the time for removing the air bubbles. The shorter the defoaming is, the more excellent the refining property is. The results are shown in Table 7.

TABLE 7

| Sample No. | Oxide composition equation | β-OH/ mm | T450 (H) % | Pt ppm | λ80/λ70 nm | T450 (L) % | Bubble removal min |
|---|---|---|---|---|---|---|---|
| 11 | I | 0.46 | 79.4 | 2.40 | 460 | 75.7 | 92 |
| 12 | | 0.58 | 79.4 | 2.00 | 457 | 80.0 | 84 |
| 13 | | 0.80 | 80.0 | 1.40 | 446 | 81.4 | 78 |
| 14 | | 1.15 | 81.2 | 0.97 | 435 | 82.5 | 72 |
| 15 | | 1.60 | 81.7 | 0.54 | 427 | 82.1 | 61 |
| 16 | | 1.97 | 81.8 | 0.26 | 423 | 84.3 | 55 |
| 21 | II | 0.39 | 77.4 | 2.80 | 417 | 76.9 | 88 |
| 22 | | 0.48 | 78.6 | 2.40 | 412 | 77.9 | 79 |
| 23 | | 0.65 | 79.7 | 1.80 | 407 | 81.9 | 75 |
| 24 | | 1.10 | 80.0 | 1.20 | 406 | 82.8 | 71 |
| 25 | | 1.50 | 80.5 | 0.83 | 405 | 84.5 | 66 |
| 26 | | 1.55 | 81.4 | 0.45 | 403 | 82.5 | 64 |
| 31 | III | 0.54 | 75.7 | 2.00 | 427 | 69.0 | 83 |
| 32 | | 0.61 | 76.5 | 1.90 | 425 | 75.1 | 81 |
| 33 | | 0.83 | 77.1 | 1.70 | 415 | 78.4 | 78 |
| 34 | | 1.14 | 78.2 | 0.61 | 411 | 82.2 | 77 |
| 35 | | 1.18 | 78.8 | 0.49 | 409 | 81.4 | 75 |
| 41 | IV | 0.34 | 72.2 | 3.50 | 438 | 61.1 | 97 |
| 42 | | 0.43 | 74.5 | 2.80 | 425 | 66.6 | 92 |
| 43 | | 0.66 | 76.8 | 1.90 | 417 | 72.3 | 87 |
| 44 | | 0.94 | 77.3 | 1.30 | 416 | 78.2 | 84 |
| 45 | | 1.13 | 77.9 | 0.87 | 414 | 79.9 | 83 |
| 46 | | 1.34 | 78.5 | 0.62 | 413 | 80.2 | 76 |
| 51 | V | 0.25 | 68.5 | 2.80 | 457 | 34.5 | 83 |
| 52 | | 0.51 | 73.1 | 2.30 | 437 | 58.1 | 75 |
| 53 | | 0.69 | 74.6 | 1.50 | 429 | 67.8 | 74 |
| 54 | | 1.02 | 75.7 | 1.10 | 426 | 71.2 | 72 |
| 55 | | 1.31 | 77.1 | 0.66 | 421 | 75.0 | 71 |
| 56 | | 1.53 | 77.3 | 0.37 | 420 | 79.3 | 70 |
| 61 | VI | 0.35 | 67.3 | 3.10 | 461 | 28.0 | 89 |
| 62 | | 0.46 | 70.0 | 2.70 | 450 | 49.8 | 87 |
| 63 | | 0.66 | 72.5 | 1.60 | 441 | 62.7 | 84 |
| 64 | | 0.89 | 73.9 | 1.20 | 437 | 70.1 | 82 |
| 65 | | 1.15 | 74.8 | 0.88 | 435 | 73.3 | 75 |
| 66 | | 1.29 | 75.6 | 0.62 | 433 | 73.4 | 71 |
| 71 | VII | 0.35 | 56.1 | 3.00 | 485 | 25.6 | 85 |
| 72 | | 0.52 | 58.0 | 1.76 | 473 | 57.4 | 74 |
| 73 | | 0.72 | 63.8 | 0.67 | 460 | 64.1 | 66 |
| 81 | VIII | 0.28 | 51.3 | 3.30 | 521 | 17.5 | 103 |
| 82 | | 0.39 | 54.8 | 1.90 | 502 | 25.2 | 94 |
| 83 | | 0.52 | 57.0 | 1.50 | 494 | 44.9 | 88 |
| 84 | | 0.65 | 61.2 | 0.88 | 480 | 56.4 | 83 |

As shown in Table 7, according to the production method of the present invention, it was confirmed that the optical glass sample having high βOH can be obtained (samples 13 to 16, samples 24 to 26, samples 33 to 35, samples 43 to 46, samples 53 to 56, samples 63 to 66, sample 72, sample 73, and samples 82 to 84). That is, the optical glass sample produced according to the present invention is expected to have high water content in the glass.

Also, as shown in Table 7, for the optical glass sample produced according to the present invention, the value of T450(H) and T450(L) are large which is the value showing the transmittance of the optical glass sample of after the heat treatment; and λ70 (or λ80) are small. Based on these results, the optical glass sample produced according to the present invention was confirmed to have excellent transmittance even after the heat treatment.

Particularly, as shown in the result of T450(L), in case the optical glass sample produced by the production method of the present invention, the transmittance was drastically improved by the heat treatment of short period of time; and considering the thickness of the sample for the measurement, the transmittance thereof was confirmed to be equivalent of the transmittance (the value of T450(H)) of after 100 hours of heat treatment.

Also, the optical glass sample produced by the production method of the present invention was confirmed with extremely reduced content of Pt. This result is thought to cause to prevent the transmittance deterioration due to Pt ion in the optical glass sample produced by the production method of the present invention, and it also matches with the excellent transmittance of the optical glass sample produced by the production method of the present invention.

Further, according to the production method of the present invention, the refining property can be improved significantly, and it was confirmed that the glass of uniform and with little air bubbles can be obtained by the clarification of short period of time.

On the other hand, since the procedure to increase the water content in the molten glass was not carried out, the optical glass sample produced by the production method corresponding to the comparative example of the present invention was confirmed to have small βOH value (sample 11, sample 12, samples 21 to 23, sample 31, sample 32, sample 41, sample 42, sample 51, sample 52, sample 61, sample 62, sample 71, and sample 81) compared to the optical glass sample produced by the same oxide composition by the production method of the present invention. That is, the optical glass sample produced by the production method corresponding to the comparative example of the present invention is expected to have low water content in the glass compared to the optical glass sample produced according to the production method of the present invention.

As such, for the optical glass sample produced by the production method corresponding to the comparative example of the present invention, it was confirmed that the transmittance of the glass after the heat treatment is lower, have more amount of Pt dissolved, and took longer time for the defoaming compared to the optical glass sample having the same oxide composition produced by the production method of the present invention.

As such, according to the production method of the present invention, the optical glass having excellent transmittance after the heat treatment can be obtained. Also, according to the production method of the present invention, the good optical glass can be obtained even if the time required for the refining step or the heat treating step are shortened, hence the production cost can be significantly reduced, and the productivity can be improved as well.

Example 2

The optical glass samples (samples 51a to 56a) were produced under the same condition as the samples 51 to 56 of the example 1 expect that antimony oxide ($Sb_2O_3$) were added to the batch raw material V as the glass material. The added amounts of antimony oxide are shown in Table 8. Note that, the unit is ppm with respect to 100 wt % of batch raw material.

[The Evaluation of the Optical Glass]

Various physical properties of the obtained optical glass samples (the samples 51a to 56a) were measured and evaluated under the same condition as the example 1.

As a result, the refractive index nd, Abbe number vd and the glass transition temperature Tg were substantially the same as the values shown in oxide composition of the example 1. The results are shown in Table 8.

TABLE 8

| Sample No. | Sb$_2$O$_3$ ppm | Volume litter | Placement time hour | Procedure to increase the water content | | β-OH/ mm | T450(H) % | Pt ppm | λ70 nm |
|---|---|---|---|---|---|---|---|---|---|
| | | | | Atmospheric adding flow amount litter/min | bubbling flow amount litter/min | | | | |
| 51a | 3000 | 40 | 7.8 | — | — | 0.25 | 64.3 | 3.0 | 467 |
| 52a | 3000 | 93 | 9.1 | — | — | 0.51 | 64.7 | 2.5 | 447 |
| 53a | 155 | 40 | 4.8 | 15 | — | 0.69 | 74.4 | 1.6 | 430 |
| 54a | 155 | 40 | 4.8 | 40 | — | 1.02 | 75.4 | 1.1 | 427 |
| 55a | 150 | 40 | 4.8 | 320 | — | 1.31 | 76.9 | 0.66 | 422 |
| 56a | 100 | 40 | 4.8 | 320 | 4 | 1.53 | 77.2 | 0.37 | 421 |

As shown in Table 8, depending on the presence of the antimony oxide in the glass, it was confirmed that the value of βOH of the glass substantially has no change (samples 51 to 56, and samples 51a to 56a).

Also, even in case of using the batch raw material added with the antimony oxide, the optical glass sample produced according to the present invention was confirmed to have excellent transmittance even after the heat treatment, and also it was confirmed that the amount of Pt dissolved in the glass was reduced (samples 53a to 56a).

Example 3

The optical glass sample (sample 55b) was produced by draining out the molten glass (the molten glass right before starting the draining step) produced by the same method as the sample 55 of the example 1 in the air atmosphere (the draining step), then molding by introducing in the mold (the molding step), and annealing at the temperature decreasing speed of −100° C./hour (the annealing step).

Next, other optical glass sample (sample 55c) was produced by the same method as the sample 55b except that each treatment atmosphere for carrying out the above mentioned draining step and the molding step was changed to oxidizing atmosphere (the atmosphere added with oxygen in the air to increase the oxygen partial pressure).

Note that, the above mentioned oxidizing atmosphere was adjusted as follows. The zone where the molten glass drains and molds were covered, and the oxygen gas was supplied to the place being covered, thus inside of the cover, that is the oxygen partial pressure of the atmosphere for draining and molding the molten glass was made higher than the oxygen partial pressure in the air. The volume ratio of the oxygen in the atmosphere for draining and molding the molten glass was roughly 30% to 40%.

Various physical properties of the obtained optical glass samples (the samples 55b to 55c) were measured and evaluated under the same condition as the example 1.

As a result, the refractive index nd, the Abbe number vd and the glass transition temperature Tg were substantially the same as the values show in oxide composition of the example 1. Also, βOH was 1.31 mm$^{-1}$.

Further, following measurements were carried out for the samples 55b and 55c.

[9] The Spectral Transmittance

Figure 4:
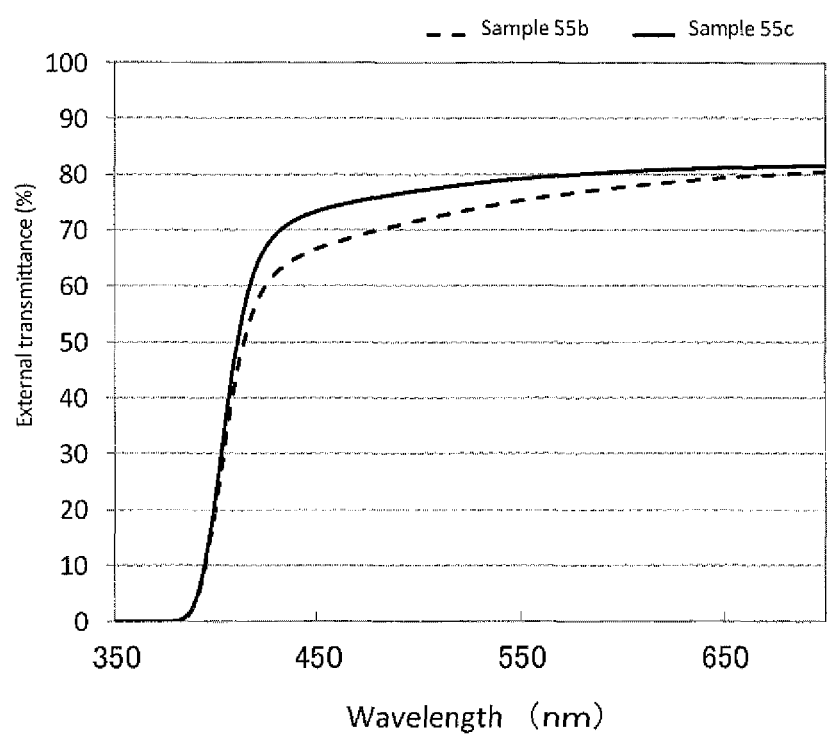
FIG. 4 is a graph showing the result of the transmittance measured regarding the sample 55 and sample 55b in the example 2.

The optical glass was processed and the plate shaped glass sample having the same thickness being optically polished so that both faces are flat and parallel to each other was prepared. To the polished face (the plate thickness direction) of this plate shaped glass sample, the light was entered in a vertical direction, and the spectral transmittance including the surface reflection loss within the wavelength range of 280 nm to 700 nm was measured using the spectral photometer. The result is shown in FIG. 4. In FIG. 4, the horizontal axis is the wavelength and the vertical axis is the external transmittance.

As shown in FIG. 4, the sample 55c produced by making the oxygen partial pressure of the atmosphere when draining and molding the molten glass higher than the oxygen partial pressure of the air, the transmittance at the visible range was higher and a little coloring was confirmed compared to the sample 55b produced by draining and molding the molten glass in the air atmosphere.

Example 4

The optical glass samples (the glass blocks) produced in the examples 1 to 3 were divided, and depending on the needs, further processing was carried out, thereby the glass material for press-molding corresponding to each optical glass was obtained.

The glass material for press-molding obtained as such was heated and softened in the air then press-molded, thereby the optical element blank close to the lens shape was produced.

Next, the optical element blank obtained was annealed in the air, then the processing such as grinding and polishing were carried out, thereby the glass made optical element such as lens and prism or so corresponding to each sample of the examples 1 to 3 were produced.

Note that, the temperature decreasing speed during the annealing was set so that the refractive index of the optical element becomes the desired value.

Also, for the press-molding method of the glass, the annealing method, the grinding method and the polishing method or so of the lens blank, the known methods were used.

The optical element produced by using the optical glass sample (samples 13 to 16, samples 24 to 26, samples 33 to 35, samples 43 to 46, samples 53 to 56, samples 63 to 66, samples 72, samples 73, samples 82 to 84, samples 53a to 56a, sample 55b and sample 55c) produced by the production method of the present invention was confirmed with the significant coloring reduction by carrying out the heat treatment in the oxidizing atmosphere such as air or so in between the molding of the molten glass and the processing of the optical element blank.

On the other hand, the optical element produced by using the optical glass samples (sample 11, sample 12, samples 21 to 23, sample 31, sample 32, sample 41, sample 42, sample 51, sample 52, sample 61, sample 62, sample 71, sample 81, sample 51b and sample 52b) produced by the production method corresponding to the comparative example of the present invention had the coloring remaining, and the coloring reduction effect was confirmed to be low even after going through the heat treatment in the oxidizing atmosphere of air or so in between the molding of the molten glass and the processing of the optical element blank.

Next, the examples according to another embodiment of the present invention will be described.

Examples A1 to A6 and Examples B1 to B6

The batch raw material was carried out with the rough melting to produce the cullet, and the cullet was placed in the crucible made of platinum and heated, melted and molded, then each optical glass having the composition shown in No. 1 to No. 4 of Table 1 were produced by the below described order. First, phosphates, orthophosphoric acid, oxides, carbonates, nitrates, sulfates were scaled and thoroughly mixed to prepare the raw material (the batch raw material). Next, this batch raw material was placed into the container made of quartz, and the glass of No. 1 and No. 2 were heated within the range of liquidus temperature LT to 1400° C., and the glass of No. 3 and No. 4 were heated at the range of liquidus temperature LT to 1300° C., thereby molten glass was made, and the cullet raw material was produced by dropping this molten glass into the water.

Next, for the glass of No. 1 and No. 2, the cullet raw material was dried, then the cullet raw material was re-mixed, and introduced into the crucible made of platinum (the melting container) then the lid made of platinum was placed on. While under this condition, the cullet raw material in the crucible made of platinum was heated within the range of the liquidus temperature (LT) of the glass composition of the cullet raw material to 1300° C. to melt the cullet raw material thereby it was made into a molten glass (the melting step). Further, after carrying out the refining by raising the temperature of the molten glass to the range of liquidus temperature LT to 1400° C. (the refining step), it was made uniform by stirring and decreasing the temperature within the range of liquidus temperature LT to 1300° C. (the uniforming step). Then, by draining the molten glass being refined and uniformed from the glass draining pipe into the mold, the glass block (the optical glass material) was molded.

Also, for the glass of No. 3 and No. 4, the cullet raw material was dried, then the cullet raw material was re-mixed, and introduced into the crucible made of platinum (the melting container) then the lid made of platinum was placed on. While under this condition, the cullet raw material in the crucible made of platinum was heated within the range of the liquidus temperature LT of the glass composition of the cullet raw material to 1250° C. to melt the cullet raw material thereby it was made into a molten glass (the melting step). Further, after carrying out the refining by raising the temperature of the molten glass in the range of liquidus temperature LT to 1300° C. (the refining step), it was made uniform by stirring and decreasing the temperature in the range of liquidus temperature LT to 1250° C. (the uniforming step). Then, by draining the molten glass being refined and uniformed from the glass draining pipe into the mold, the glass block (the optical glass material) was molded.

Note that, when carrying out the melting step, the refining step, the uniforming step, the pipe made of platinum is inserted into the crucible made of platinum from the opening part provided at the lid made of platinum, and depending on the needs, the water vapor was able to be supplied to the space in the crucible made of platinum via this pipe made of the platinum. The flow amount of the water vapor per unit time supplied into the crucible made of platinum is shown in Table 9 and Table 10. Note that, the flow amount of the water vapor shown in Table 9 and Table 10 is the value converted in the flow amount at usual temperature, and the unit is litter/min. Also, in case the water vapor is not supplied into the crucible, the crucible made of platinum is covered by the lid made of platinum and without the opening part; and the water was suppressed from evaporating from the cullet material and the molten glass during the melting by sealing the crucible made of platinum in between the melting step to the uniforming step via the refining step.

Next, each glass block (the optical glass material) made of the glass of No. 1 and the glass of No. 2 was increased with the temperature to 600° C. from 25° C. in air taking 2 hours, then annealed at 600° C. (the heat treatment), then carried out with the procedure to reduce the coloring of the glass block (the optical glass material). Then, the glass block was cooled to the usual temperature at the temperature decreasing speed of −30° C./hour. Note that, each glass block made of the glass of no. 1 and the glass of No. 2 was maintained at 600° C. for 1 hour. Similarly, each glass block (the optical glass material) made of the glass of No. 3 and the glass of No. 4 were increased with the temperature to 570° C. from 25° C. in air taking 2 hours, and annealed at 570° C. (the heat treatment), then carried out the procedure to reduce the coloring of the glass block (the optical glass material). Then, the glass block was cooled to the usual temperature at the temperature decreasing speed of −30° C./hour. Note that, each glass block of the glass of No. 3 and the glass of No. 4 were maintained at 570° C. for 4 hours and 30 minutes.

After the annealing, βOH value, λτ80, the refractive index nd, Abbe number νd, and the glass transition temperature of the glass block (the optical glass) of the glass composition of No. 1 and No. 3 were measured. For the optical glass of No. 1, βOH value, T450 and λτ80 are shown in Table 9; for the optical glass of No. 3, βOH value, T450 and λτ80 are shown in Table 10; and the refractive index nd, Abbe number νd and the glass transition temperature Tg of each optical glass of No. 1 to No. 4 are shown in Table 1.

Note that, the measured values of the refractive index nd and Abbe number νd are the value measured using the sample cooled at the cooling speed of 30° C. per hour. For the measured value of the liquidus temperature LT, the sample was re-heated, and maintained for 2 hours, then cooled to room temperature. Then, the presence of the crystal precipitation inside the glass was verified by the optical microscope, and the lowest temperature of which the crystal is not present was set as the liquidus temperature.

The examples A1 to A3 of Table 9 is the date regarding the optical glass produced without introducing the water vapor in the melting container from the pipe made of platinum; and the examples A4 to A6 are the data regarding the optical glass produced by introducing the water vapor into the melting container from the pipe made of platinum. The examples A1 to A3 used orthophosphoric acid raw material, and also the air tightness of the melting container was enhanced, thereby the water was introduced into the molten glass and suppressed the evaporation of the water vapor from the melting container. Further, for the examples A4 to A6, the water vapor partial pressure in the melting container was actively increased.

When T450 and λτ80 of the optical glass of the examples A1 to A3, and T450 and λτ80 of the optical glass of the examples A4 to A6 were compared, the examples A4 to A6 wherein the water vapor partial pressure inside the melting container was actively increased had larger βOH value as well. Thus, from the result of the visual observation of the glass block of before and after of the below described heat treatment, it can be understood that even more significant reduction of the coloring degree has been done.

Also, the examples B1 to B3 of the Table 10 is the data regarding the optical glass produced without the introduction of the water vapor into the melting container from the pipe made of platinum; and the examples B4 to B6 is the data regarding the optical glass produced by introducing the water vapor into the melting container made of platinum. The examples B1 to B3 used orthophosphoric acid raw material, and also the air tightness of the melting container was enhanced, thereby the water is introduced into the molten glass and suppressed the evaporation of the water vapor from the melting container. Further, for the examples B4 to B6, the water vapor partial pressure in the melting container was actively increased.

When T450 and λτ80 of the optical glass of the examples B1 to B3, and T450 and λτ80 of the optical glass of the examples B4 to B6 were compared, the examples B4 to B6 wherein the water vapor partial pressure inside the melting container was actively increased had larger βOH value as well. Thus, from the result of the visual observation of the glass block of before and after of the below described heat treatment, it can be understood that even more significant reduction of the coloring degree has been done.

As described in above, by heat treating the optical glass having the glass composition of No. 1 and No. 3 in the oxidizing atmosphere, the coloring can be significantly reduced, and the optical glass with little coloring was obtained.

TABLE 9

| | Flow amount of the water vapor [litter/min] | βOH [mm$^{-1}$] | T450 [%] | λ80 [nm] |
|---|---|---|---|---|
| Example A1 | 0 | 0.77 | 67.75 | 502 |
| Example A2 | 0 | 0.52 | 58.06 | — |
| Example A3 | 0 | 0.38 | 51.96 | — |
| Example A4 | 2 | 1.53 | 77.99 | 423 |
| Example A5 | 2 | 1.62 | 73.35 | 417 |
| Example A6 | 2 | 1.69 | 76.50 | 422 |

TABLE 10

| | Flow amount of the water vapor [litter/min] | βOH [mm$^{-1}$] | T450 [%] | λ80 [nm] |
|---|---|---|---|---|
| Example B1 | 0 | 0.14 | 14.25 | — |
| Example B2 | 0 | 0.17 | 15.42 | — |
| Example B3 | 0 | 0.21 | 25.6 | — |
| Example B4 | 2 | 0.97 | 64.76 | 457 |
| Example B5 | 2 | 1.17 | 68.2 | 450 |
| Example B6 | 2 | 1.17 | 65.21 | 455 |

Note that, in the examples A1 to A6 and the examples B1 to B6, the crucible made of platinum was used as the melting container; however the optical glass material can be produced by using the crucible made of platinum alloy, crucible made of gold and crucible made of gold alloy or so, and by heat treating the obtained optical glass material in the oxidizing atmosphere, the coloring thereof can be significantly reduced, thus as a result the optical glass with little coloring were able to be obtained. Further, in the examples A4 to A6 and the examples B4 to B6, the water vapor was supplied via the pipe inside the platinum crucible covered by lid; however the same effect can be obtained by bubbling the water vapor into the molten glass inside the platinum crucible. Note that, even in case the composition of the optical glass produced are changed to the glass composition of No. 2 and No. 4 shown in Table 1, the same effect as the glass composition of No. 1 and No. 3 can be obtained.

Also, in the examples A4 to A6 and B4 to B6, as the water vapor supplied into the crucible made of platinum, the water vapor obtained by boiling the water using the boiler was used. However, when producing the optical glass material, the water vapor obtained by other method can be used accordingly. For example, the water sprayed in a mist form to the glass melting furnace of flame resistant which houses the melting container such as crucible made of platinum or so to make the water vapor, then water vapor partial pressure of the atmosphere inside the glass melting furnace and the melting container may be increased. Alternatively, the water may be supplied into the glass melting furnace using the pump, and boiling the water by the heat inside the melting furnace, thereby forming the water vapor and the water vapor partial pressure in the glass melting atmosphere may be increased; or other method may be used as well. The water content in the optical glass material can be increased by using these methods.

Comparative Example 1

The glass block (the optical glass material) was produced as same as the examples A1 to A3 except that it was maintained opened by not covering the melting container with the lid, then the heat treatment was carried out as same as the examples A1 to A6. However, the coloring degrees of the glass block (the optical glass) being heat treated was larger than the examples A1 to A6.

Also, the glass block (the optical glass material) was produced as same as the comparative example A1 except that the glass composition was the composition of No. 2 instead of No. 1 of Table 1, and the heat treatment was carried out. However, the coloring degrees of the glass block the optical glass material) being heat treated was larger than the examples A1 to A6.

Comparative Example B1

The glass block (the optical glass material) was produced as same as the examples B1 to B3 except that it was maintained opened by not covering the melting container with the lid, then the heat treatment was carried out as same as the examples B1 to B6. However, the coloring degrees of the glass block (the optical glass) being heat treated was larger than the examples B1 to B6.

Also, the glass block (the optical glass material) was produced as same as the comparative example B1 except that the glass composition was the composition of No. 4 instead of No. 3 of Table 1, and the heat treatment was carried out. However, the coloring degrees of the glass block the optical glass material) being heat treated was larger than the examples B1 to B6.

Comparative Example A2

The glass block (the optical glass material) was produced as same as the examples A4 to A6 except that the nitrogen gas was introduced into the melting furnace instead of the water vapor, then the heat treatment was carried out as same as the examples A1 to A6. However, the coloring degree of the glass block being heat treated (the optical glass) was extremely larger than the glass block (the optical glass) of the comparative example A1.

Also, the glass block (the optical glass) was produced as same as the comparative example 2 except that the glass composition was the composition of No. 2 instead of the composition of No. 1 shown in Table 1; then the heat treatment was carried out. However the results were the same as the comparative example A2.

Comparative Example B2

The glass block (the optical glass material) was produced as same as the examples B4 to B6 except that the nitrogen gas was introduced into the melting furnace instead of the water vapor, then the heat treatment was carried out as same as the examples B1 to B6. However, the coloring degree of the glass block being heat treated (the optical glass) was extremely larger than the glass block (the optical glass) of the comparative example B1.

Also, the glass block (the optical glass) was produced as same as the comparative example B2 except that the glass composition was the composition of No. 4 instead of the composition of No. 3 shown in Table 1; then the heat treatment was carried out. However the results were the same as the comparative example B2.

Comparative Example 3

The glass block (the optical glass) was produced as same as the examples A4 to A6 except that the reducing gas was introduced into the melting furnace instead of the water vapor, then the heat treatment was carried out as same as the examples A1 to A6. However, the coloring degree of the glass block being heat treated (the optical glass) was extremely larger than the glass block (the optical glass) of the comparative example 1.

Note that, if the concentration of the reducing gas is high, the reducing gas component forms alloy with the platinum crucible, and causes to break the crucible. This is same for the cases when the glass composition is changed to the composition of No. 1 to No. 4 shown in Table 1.

(The Detail of the Observation Result of the Coloring Degree of the Glass Block at Before and after the Heat Treatment)

The observation results of the coloring degree of before and after the heat treatment of the glass block produced in the examples and the comparative examples are shown in Table 11. Note that, the coloring degree was evaluated by placing the glass block having planar shape or approximate circular shape on the white paper and visually observing under the room light. Note that, the glass block of the examples and the comparative examples used for the observation had approximately the same thickness. Also, the evaluation standard of the transparency shown in Table 11 is as follows. A: although the glass block (the optical glass) is lightly colored, it is clear enough to recognize the whiteness of the paper positioned below the glass block (the optical glass) (High transparency). B: although the glass block (the optical glass) is colored, it is clear enough to recognize the paper positioned below the glass block (the optical glass) (moderate transparency). C: the glass block (the optical glass) is heavily colored, and it has low transparency such that the paper positioned below the glass block (the optical glass) can be barely recognized (low transparency). D: the glass block (the optical glass) is completely opaque, and the paper positioned below the glass block (the optical glass) cannot be recognized (opaque).

TABLE 11

| | Before heat treatment (immediately after molding) | | After heat treatment | |
| --- | --- | --- | --- | --- |
| | color | clarity | color | clarity |
| Example A1 | dark brown | D | light yellow | A |
| Example B1 | black | D | light yellow | A |
| Comparative example A1 | brown | C | brown | B |
| Comparative example A2 | black | D | dark purple | D |
| Comparative example B1 | dark purple | C | purple | B |
| Comparative example B2 | black | D | dark purple | D |

(The Verification of Platinum being Mixed)

Among the glass blocks of after the heat treatment which were used in the examples A1 to A6, B1 to B6 and the comparative examples A1, A2, B1, B2 and 3, the inside of the glass blocks were observed by the optical microscope except for those having "D" for the transparency evaluation. As a result, no platinum contaminant being mixed or the crystal precipitated was found in the inside of all the glass blocks. Also, the platinum dissolved amount in the glass block used in the examples A1 to A6, B1 to B6 and the comparative examples A1, A2, B1, B2 and 3 were measured by ICP emission spectrometry, the results were less than 2 ppm for all cases.

Example 7

The optical glass produced by the examples A1 to A6 and the examples B1 to B6 were processed to glass material for press-molding, and heated and softened for press-molding, thereby the optical element blanks were produced. Further, the optical element blanks were processed to produce the optical element such as spherical lens and prism or so. Further, the final products were obtained by coating the anti-reflection film to the lens surface and prism surface. For the optical glass of No. 2 and No. 4 shown in Table 1, the glass material for press-molding, the optical element blank and the optical element were produced similarly.

Hereinbelow is the summary.

The preferable other embodiment is the production method of the optical glass material by at least carrying out a heating and melting step to heat and melt the glass raw material in the melting container to obtain the molten glass, a molding step of molding said molten glass in said melting container to a predetermined shape, thereby producing the optical glass material which is an oxide glass including at least one oxide of $TiO_2$, $Nb_2O_5$, $WO_3$ and $Bi_2O_3$ as a glass component, and a total content of $TiO_2$, $Nb_2O_5$, $WO_3$ and $Bi_2O_3$ is 30 mol % or more, and a water is supplied in the melting container during said heating and melting step.

In the present embodiment, the embodiment of supplying the water in said melting container is preferably any one selected from a first embodiment of supplying the water vapor into the atmosphere near the liquid face of the molten glass, a second embodiment of supplying the water vapor by bubbling in the molten glass, and a third embodiment which is the combination of the first embodiment and the second embodiment.

In the present embodiment, phosphoric acid component is preferably included in said glass raw material.

The preferable other embodiment is the production method of the optical glass material by at least carrying out a heating and melting step to heat and melt the glass raw material in the melting container to obtain the molten glass, a molding step of molding said molten glass in said melting container to a predetermined shape, thereby producing the optical glass material which is an oxide glass including at least one oxide of $TiO_2$, $Nb_2O_5$, $WO_3$ and $Bi_2O_3$ as a glass component, and a total content of $TiO_2$, $Nb_2O_5$, $WO_3$ and $Bi_2O_3$ is 30 mol % or more, and said glass raw material contains water and also said melting container is roughly sealed during said heating and melting step.

In the present embodiment, phosphoric acid component is preferably included in said glass raw material.

In the present embodiment, said optical glass material further includes $P_2O_5$, and the content of $P_2O_5$ included in said optical glass material is preferably within a range of 10 mol % to 35 mol %.

In the present embodiment, the material constituting said melting container is preferably at least one metal material selected from noble metal, noble metal alloy or so.

Further, other preferable embodiment is the production method of the optical glass wherein the optical glass material is produced by the production method of the optical glass material as set forth in any of the above, and producing the optical glass having the refractive index nd of 1.9 or more by at least carrying out the heat treating step which heat treats said optical glass material in the oxidizing atmosphere.

In the present embodiment, said heat treating step is preferably carried out so that λτ80 of said optical glass satisfies the following equation (4).

$$\lambda\tau 80 < aX + b \quad (4)$$

[In equation (4), λτ80 is the wavelength (nm) wherein the internal transmittance is 80% which is obtained by measuring the internal transmittance at the wavelength of 280 to 700 nm when the light enters into said optical glass in parallel to the thickness direction thereof, then calculating based on the measured internal transmittance being measured assuming that the thickness of said optical glass is 10 mm. "a" is a constant (1.8359 nm/mol %), "b" is a constant (351.06 nm), and "X" is the total content (mol %) of $TiO_2$, $Nb_2O_5$, $WO_3$ and $Bi_2O_3$.]

Further, other preferable embodiment is the production method of the glass material for press-molding wherein the optical glass material is produced by the production method of the optical glass material as set forth in any of the above, and producing the optical glass having the refractive index nd of 1.9 or more by at least carrying out the heat treating step which heat treats said optical glass material in the oxidizing atmosphere.

In the present embodiment, said heat treating step is preferably carried out so that λτ80 of said optical glass satisfies the following equation (4).

$$\lambda\tau 80 < aX + b \quad (4)$$

[In equation (4), λτ80 is the wavelength (nm) wherein the internal transmittance is 80% which is obtained by measuring the internal transmittance at the wavelength of 280 to 700 nm when the light enters into said optical glass in parallel to the thickness direction thereof, then calculating based on the internal transmittance being measured assuming that the thickness of said optical glass is 10 mm. "a" is a constant (1.8359 nm/mol %), "b" is a constant (351.06 nm), and "X" is the total content (mol %) of $TiO_2$, $Nb_2O_5$, $WO_3$ and $Bi_2O_3$.]

Further, other preferable embodiment is the production method of the optical element wherein the optical glass material is produced by the production method of the optical glass material as set forth in any of the above, and producing the optical glass having the refractive index nd of 1.9 or more by at least carrying out the heat treating step which heat treats said optical glass material in the oxidizing atmosphere.

In the present embodiment, said heat treating step is preferably carried out so that λτ80 of said optical glass satisfies the following equation (4).

$$\lambda\tau 80 < aX + b \quad (4)$$

[In equation (4), λτ80 is the wavelength (nm) wherein the internal transmittance is 80% which is obtained by measuring the internal transmittance at the wavelength of 280 to 700 nm when the light enters into said optical glass in parallel to the thickness direction thereof, then calculating based on the internal transmittance being measured assuming that the thickness of said optical glass is 10 mm. "a" is a constant (1.8359 nm/mol %), "b" is a constant (351.06 nm), and "X" is the total content (mol %) of $TiO_2$, $Nb_2O_5$, $WO_3$ and $Bi_2O_3$.]

The invention claimed is:

1. An optical glass production method comprising carrying out a procedure to increase a water content in a molten glass during a melting step (i) of a glass raw material including at least one of $TiO_2$, $Nb_2O_5$, $WO_3$ and $Bi_2O_3$ in a melting container to thereby obtain the molten glass, wherein the optical glass has a total content of $TiO_2$, $Nb_2O_5$, $WO_3$ and $Bi_2O_3$ of 20 mol % or more and a $P_2O_5$ content of 7 to 40 mol %, and the optical glass satisfies at least one selected from a group consisting of the following (a), (b), (c) and (d):

(a) a total amount of $P_2O_5$, $SiO_2$, $B_2O_3$, $TiO_2$, $Nb_2O_5$, $WO_3$, $Bi_2O_3$, MgO, CaO, SrO, BaO, ZnO, $Li_2O$, $Na_2O$, $K_2O$, $Al_2O_3$, $ZrO_2$, $GeO_2$, $TeO_2$ and $Sb_2O_3$ is 90 mol % or more, (b) a glass transition temperature Tg is 541° C. or more, (c) a content of $Nb_2O_5$ is 5 mol % or more, and (d) a content of $TiO_2$ is 1 mol % or more.

2. The optical glass production method as set forth in claim 1, wherein said optical glass is phosphate glass.

3. The optical glass production method as set forth in claim 2, wherein said optical glass has a content of $P_2O_5$ larger than a content of $SiO_2$, and larger than a content of $B_2O_3$ in terms of mol % expression.

4. The optical glass production method as set forth in claim 1, wherein said optical glass is substantially free of vanadium.

5. The optical glass production method as set forth in claim 1, wherein said procedure to increase the water content in said molten glass is carried out by at least one of a treatment of adding water vapor in a melting atmosphere and a treatment of bubbling a gas including water vapor in a molten material of the optical glass.

6. The optical glass production method as set forth in claim 1, wherein said melting container is made of a metal material.

7. The optical glass production method as set forth in claim 1, wherein an oxygen partial pressure within the melting container during said melting step (i) is lower than an oxygen partial pressure in air.

8. The optical glass production method as set forth in claim 1 further comprising
step (ii) of draining out said molten glass from said melting container,
step (iii) of molding said molten glass; and at least one of said step (ii) and said step (iii) are carried out under oxidizing atmosphere.

9. The optical glass production method as set forth in claim 8, wherein said oxidizing atmosphere is an air atmosphere or an atmosphere having higher oxygen partial pressure than air.

10. The optical glass production method as set forth in claim 1, further comprising step (iv) of heat treating said optical glass; and said step (iv) is carried out under oxidizing atmosphere.

11. A production method of an optical element comprising,
step of producing an optical glass by the production method as set forth in claim 1, and
step of further molding or processing said optical glass.

12. The optical glass production method as set forth in claim 1, wherein said procedure to increase the water content in said molten glass is carried out by at least one of a treatment of adding water vapor in a melting atmosphere, a treatment of bubbling a gas including water vapor in a molten material of the optical glass, and a treatment of melting the optical glass containing water in a sealed space.

13. A glass production method comprising a melting step (i) carrying out a heating and melting a glass raw material including at least one of $TiO_2$, $Nb_2O_5$, $WO_3$ and $Bi_2O_3$ in a melting container to thereby obtaining a molten glass, and
a step (iv) of heat treating the obtained glass, wherein a procedure to increase a water content in a molten glass is carried out during the melting step (i),
wherein the glass has a $P_2O_5$ content of 7 to 40 mol %, and the glass satisfies at least one selected from a group consisting of the following (a), (b), (c) and (d):
(a) a total amount of $P_2O_5$, $SiO_2$, $B_2O_3$, $TiO_2$, $Nb_2O_5$, $WO_3$, $Bi_2O_3$, MgO, CaO, SrO, BaO, ZnO, $Li_2O$, $Na_2O$, $K_2O$, $Al_2O_3$, $ZrO_2$, $GeO_2$, $TeO_2$ and $Sb_2O_3$ is 90 mol % or more,
(b) a glass transition temperature Tg is 541° C. or more,
(c) a content of $Nb_2O_5$ is 5 mol % or more, and
(d) a content of $TiO_2$ is 1 mol % or more.

14. The glass production method as set forth in claim 13, wherein a total content of $TiO_2$, $Nb_2O_5$, $WO_3$ and $Bi_2O_3$ included in said glass is 20 mol % or more.

15. The glass production method as set forth in claim 13, wherein said glass is phosphate glass.

16. The glass production method as set forth in claim 15, wherein said glass has a content of $P_2O_5$ larger than a content of $SiO_2$, and larger than a content of $B_2O_3$ in terms of mol % expression.

17. The glass production method as set forth in claim 13, wherein said glass is substantially free of vanadium.

18. The glass production method as set forth in claim 13, wherein said procedure to increase the water content in said molten glass is carried out by at least one of a treatment of adding water vapor in a melting atmosphere and a treatment of bubbling a gas including water vapor in a molten material of the optical glass.

19. The glass production method as set forth in claim 13, wherein said melting container is made of a metal material.

20. The glass production method as set forth in claim 13, wherein an oxygen partial pressure within the melting container during said melting step (i) is lower than the oxygen partial pressure in air.

21. The glass production method as set forth in claim 13, further comprising
step (ii) of draining out said molten glass from said melting container,
step (iii) of molding said molten glass; and at least one of said step (ii) and said step (iii) are carried out under oxidizing atmosphere.

22. The glass production method as set forth in claim 21, wherein said oxidizing atmosphere is an air atmosphere or an atmosphere having higher oxygen partial pressure than air.

23. A production method of an optical element comprising,
step of producing a glass by the production method as set forth in claim 13, and
step of further molding or processing said glass.

* * * * *